(12) United States Patent
Winstead et al.

(10) Patent No.: US 7,571,019 B2
(45) Date of Patent: Aug. 4, 2009

(54) INTEGRATED CONFIGURATION, FLOW AND EXECUTION SYSTEM FOR SEMICONDUCTOR DEVICE EXPERIMENTAL FLOWS AND PRODUCTION FLOWS

(75) Inventors: Charles H. Winstead, Portland, OR (US); Rajshree P. Sankaran, Portland, OR (US); Samer M. Taha, Beaverton, OR (US); Jiang Qu, Portland, OR (US); Chandra Mouli, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 60 days.

(21) Appl. No.: 11/325,926

(22) Filed: Dec. 30, 2005

(65) Prior Publication Data

US 2007/0156272 A1 Jul. 5, 2007

(51) Int. Cl.
*G06F 19/00* (2006.01)
(52) U.S. Cl. .................. 700/100; 700/86; 700/97; 700/121
(58) Field of Classification Search .......... 700/99, 700/100, 108–110, 121, 97, 103, 29, 86
See application file for complete search history.

(56) References Cited

U.S. PATENT DOCUMENTS

| | | | | |
|---|---|---|---|---|
| 5,980,591 A * | 11/1999 | Akimoto et al. | ............. | 700/121 |
| 6,772,035 B2 * | 8/2004 | Mouli | ........................ | 700/121 |
| 6,912,439 B2 * | 6/2005 | Mouli | ........................ | 700/121 |
| 2001/0034562 A1 | 10/2001 | Aumer et al. | | |
| 2003/0036971 A1 | 2/2003 | Tanabe | | |
| 2003/0216827 A1 * | 11/2003 | Mouli | ........................ | 700/121 |
| 2004/0220693 A1 * | 11/2004 | Mouli | ........................ | 700/121 |
| 2005/0039161 A1 | 2/2005 | Pfander et al. | | |
| 2005/0209865 A1 | 9/2005 | Doss et al. | | |
| 2005/0267622 A1 * | 12/2005 | Mouli | ........................ | 700/121 |
| 2006/0079983 A1 * | 4/2006 | Willis | ........................ | 700/108 |

OTHER PUBLICATIONS

U.S. Appl. No. 11/312,131, "Mechanism for Execution of Global Flow Changes in a Manufacturing System," Charles H. Winstead et al., filed Dec. 20, 2005.
Intel Corporation, PCT Notification of Transmittal of International Search Report and the Written Opinion of hte International Searching Authority, or the Delcaration, U.S. Appl. No. PCT/US2006/047492, filed Dec. 11, 2006.
International Preliminary Report for PCT Appl. No. PCT/US2006/047491 dated Jul. 10, 2008 (6 pages).

* cited by examiner

*Primary Examiner*—Albert DeCady
*Assistant Examiner*—Charles R Kasenge
(74) *Attorney, Agent, or Firm*—Blakely Sokoloff Taylor & Zafman LLP

(57) ABSTRACT

According to embodiments of the invention, an integrated configuration, flow and execution systems (ICFES) may be used to specify, control and record a history of processing of both semiconductor device experimental lots and production lots of wafers. Moreover, the system allows combining of one or more partial flows of pre-existing flow blocks, and special processing into another processing flow block. A lot plan can be created that includes the flow block, and the lot plan can be updated to include partial flows and special processing before or during processing of the lot plan.

24 Claims, 18 Drawing Sheets

FlowPlan_Expt1001

| | |
|---|---|
| StdFB_A | 10 |
| StdFB_A | 20 |
| StdFB_A | 30 |
| StdFB_B | 41 |
| StdFB_B | 51 |
| StdFB_B | 61 |
| StdFB_B | 71 |

— 602

LotPlan_Expt1001

FlowPlan_Expt1001

| | | |
|---|---|---|
| StdFB_A | 10 | |
| StdFB_A | 20 | |
| StdFB_A | 30 | ← Special Processing Instructions |
| ExptFB_B | 41 | |
| ExptFB_B | 51 | |
| ExptFB_B | 61 | |
| ExptFB_B | 71 | |

— 604

LotPlan_Expt1001

Historical Flow

| | | |
|---|---|---|
| StdFB_A | 10 | |
| StdFB_A | 20 | |
| StdFB_A | 30 | ← with note for Special Processing Operations |
| ExptFB_B | 41 | |
| ExptFB_B | 51 | |
| ExptFB_B | 41 | |
| ExptFB_B | 51 | |

<u>616</u>

FlowPlan_Expt1001

| | |
|---|---|
| ExptFB_B | 61 |
| ExptFB_B | 71 |

| Assigned Route | | | | | | | | | | |
|---|---|---|---|---|---|---|---|---|---|---|
| Rwk | Oper | Short Desc | Instr | Spl | Mer | SIF | Com | Dat | | |
| 0 | 0000 | SD 0000 | | | | | | | | |
| 0 | 0001 | SD 0001 | Y | | | | | | | |
| 0 | 0002 | SD 0002 | | | | | | | | |
| 0 | 0003 | S'D 0003x | | | | | | | | |
| 0 | 0004 | SD 0004 | | | | | | | | |
| 0 | 0005 | SD 0005TTT | | Y | | P | | | | |
| 0 | 0006 | SD 0006 | | | | | | | | |
| 0 | 0007 | SD 0007 | | | | | | | | |
| 0 | 0008 | SD 0008 | | | | | | | | |
| 0 | 0009 | SD 0009 | | | | | | | | |
| 0 | 0010 | S RECSTKRM | Y | | Y | | | | | |
| 0 | 0011 | SD 0011* | | | | P | | | | |
| 0 | 0012 | SD 0012 | | | | | | | | |
| 0 | 0013 | SD 0013 | | | | | | | | |
| 0 | 0014 | SD 0014 | | | | | | | | |
| 0 | 0015 | SD 0015 | | | | | | | | |
| 0 | 0016 | SD 0016 | | | | | | | | |
| 0 | 0017 | SD 0017 | | | | | | | | |
| 0 | 0018 | SD 0018 | | | | | | | | |
| 0 | 0019 | SD 0019 tp | | | | | | | | |

Tabs: LotPlan Attributes | Flow Operations | PFC | Revision History | YLP9533.1

Context menu:
- Add SIF
- Edit SIF
- View SIF
- Copy A SIF To This Operation
- Delete SIF

FIG. 10

| | Assigned Route | Rwk | Oper | Short Desc | Instr | Spl | Mer | SiF | Com | Dat |
|---|---|---|---|---|---|---|---|---|---|---|
| ✓ | FE64.00156 | 0 | 0001 | SD 0001 | D | | | | Y | |
| ✓ | FE64.00156 | 0 | 0002 | SD 0002 | | | | D | Y | Y |
| ✓ | FE64.00156 | 0 | 0003 | S*D 0003x | | | | | | |
| ✓ | FE64.00156 | 0 | 0004 | SD 0004 | | | | | | |
| ● | FE64.00156 | 0 | 0005 | SD 0005TTT | | Y | | | | |
| ○ | FE64.00156 | 0 | 0006 | SD 0006 | | | | | | |
| ○ | FE64.00156 | 0 | 0007 | SD 0007 | | | | | | |
| ○ | FE64.00156 | 0 | 0008 | SD 0008 | | | | | | |
| ○ | FE64.00156 | 0 | 0009 | SD 0009 | | | | | | |
| ○ | FE64.00156 | 0 | 0010 | S RECSTKRM | Y | | Y | | | |
| ○ | FE64.00156 | 0 | 0011 | SD 0011* | | | | | | |
| ○ | FE64.00156 | 0 | 0012 | SD 0012 | | | | | | |
| ○ | FE64.00156 | 0 | 0013 | SD 0013 | | | | P | | |
| ○ | FE64.00156 | 0 | 0014 | SD 0014 | | | | | | |
| ○ | FE64.00156 | 0 | 0015 | SD 0015 | | | | | | |
| ○ | FE64.00156 | 0 | 0016 | SD 0016 | | | | | | |
| ○ | FE64.00156 | 0 | 0017 | SD 0017 | | | | | | |
| ○ | FE64.00156 | 0 | 0018 | SD 0018 | | | | | | |
| ○ | FE64.00156 | 0 | 0019 | SD 0019te | | | | | | |

FIG. 13

| | Assigned Route | Rwk | Oper | Short Desc | Instr | Spl | Mer | SIF | Com | Dat |
|---|---|---|---|---|---|---|---|---|---|---|
| ✓ | FE64.00156 | 0 | 0001 | SD 0001 | D | | | | Y | |
| ✓ | FE64.00156 | 0 | 0002 | SD 0002 | | | | D | Y | Y |
| ✓ | FE64.00156 | 0 | 0003 | S*D 0003x | | | | | | |
| ✓ | FE64.00156 | 0 | 0004 | SD 0004 | | | | | | |
| ✓ | FE64.00156 | 0 | 0005 | SD 0005TTT | | D | | | | |
| ✓ | FE64.00156 | 0 | 0006 | SD 0006 | | | | | | |
| ✓ | FE64.00156 | 0 | 0007 | SD 0007 | | | | | | |
| ✓ | FE64.00156 | 0 | 0008 | SD 0008 | | | | | | |
| ✓ | FE64.00156 | 0 | 0009 | SD 0009 | | | | | | |
| ✓ | FE64.00156 | 0 | 0010 | S RECSTKRM | D | | D | | Y | |
| ✓ | FE64.00157 | 0 | 0011 | SD 0011* | | | | | | |
| ✓ | FE64.00157 | 0 | 0012 | SD 0012 | | | | | | |
| ✓ | FE64.00157 | 0 | 0013 | SD 0013 | | | | | | |
| ✓ | FE64.00157 | 0 | 0014 | SD 0014 | | | | | | |
| ✓ | FE64.00157 | 0 | 0015 | SD 0015 | | | | | | |
| ✓ | FE64.00157 | 0 | 0016 | SD 0016 | | | | D | Y | Y |
| ✓ | FE64.00157 | 0 | 0017 | SD 0017 | | | | | | |
| ✓ | FE64.00157 | 0 | 0018 | SD 0018 | | | | | | |
| ✓ | FE64.00157 | 0 | 0019 | SD 0019te | | | | | | |
| ✓ | FE64.00157 | 0 | 0025 | SD 0025 | | | | | | |

FIG. 16

INTEGRATED CONFIGURATION, FLOW AND EXECUTION SYSTEM FOR SEMICONDUCTOR DEVICE EXPERIMENTAL FLOWS AND PRODUCTION FLOWS

FIELD

Manufacturing execution systems (MES) to specify, control and record a history of processing during manufacturing of semiconductor device experimental wafers lots and production wafers lots.

BACKGROUND

Manufacturing execution systems (MES) are typically used to specify, control and record a history of processing of semiconductor device manufacturing objects. A manufacturing object may be described as a physical unit, such as a lot of semiconductor device wafers (e.g., a group of 25 wafers), for which a sequence of manufacturing operations with standard or special processing conditions at each operation are to be specified and executed to create a "physical object" (e.g., wafers with semiconductor devices thereon).

Sometimes, a manufacturing object may be used as an experimental or production manufacturing lot or portions thereof. An experimental lot may be a lot processed to determine or select manufacturing operations for processing production lots. A production lot may be a lot to be processed in accordance with the selected operations to produce physical objects or semiconductor devices for use, distribution, sale, and the like.

In the front part of semiconductor manufacturing, a "full" flow (e.g., a flow plan which includes one or more flow blocks) is specified for processing particular lots into wafers having semiconductor devices, because the lot is the size of a single group of wafers that is delivered from tool to tool. The flow starts out with blank wafers and ends up with wafers with hundreds of chips patterned on them. In this context each chip may be considered a "device" or a type of device, such that there is one or more devices per chip. As known in the art, each of these chips may have millions to hundreds of millions of semiconductor transistors and/or electronic circuits. In the back half of semiconductor manufacturing, the wafers are sawed (e.g., "diced") into individual semiconductor chips, and then "lots" of the individual chips (e.g., the individual units of the lot now separated) are tracked through the assembly and test process. Thus, a manufacturing object may start as a "blank" lot of wafers, that after being processed according to a "full" flow plan, becomes a lot of wafers including semiconductor devices (e.g., each wafer having devices is a "physical object").

Current MES separate the configuration from the execution systems. For example, new flows are created using a flow block editor. Non-standard processing is specified in a separate experiment editor, where experiments are thought to only consist of special processing instructions overlaid on pre-defined flows. No integrated flow and special processing editor exits. Furthermore, a lot's processing is started to follow its flow and experiment specification, and history is build up during its processing. However, accessing this history requires a separate history viewer. Experimental flow changes during processing thus require the user to navigate several editors: first, the flow block editor, to define a new version of the flow; second, the experiment editor, to define special instructions to ensure the lot doesn't continue processing past the point of the flow edits; third, the history viewer, to review the processing of the lot while editing the future flow, and forth, an execution interface, to adjust the lot and the experiment from the old version of its flow to the new version of its flow.

Moreover, current experimental MES flows and production MES flows are configured separately, for only the experimental or production processing devices, respectively. For instance, full flexibility for each lot to have non-standard flows, parts of standard flows, special processing, in-situ editing, etc. is enabled for experimental flows. However, for the experimental flow, the engineer does not have full history and future flow information when making changes. On the other hand, in a production environment, it is necessary to efficiently manage a production flow to control processing of 100's of lots that follow a common flow (the production flow).

Thus, once experimenting to produce a satisfactory or sufficient experimental flow plan for use in or as part of a production flow plan is complete, a separate production flow for production must be configured from the experimental flow. As a result, specifying, controlling and recording a history of processing of an experimental flow and creating a flow for production from the experimental flow is currently performed with an inefficient and nonintegrated system.

Once a production flow plan or lot plan is created based on the experimental flow plan or lot plan, the production flow plan or lot plan may then be used to process production lots of wafers. The production flow may include a production flow blocks that may be created using a production editor. A production history may be created to track or record results of the processing. Again, viewing the production history typically requires an editor or interface other than that used to create the production flow blocks.

For example, a lot's flow history is usually available in a static view that contains very detailed processing history information, but no information about the future flow of the lot (e.g., future or not yet executed operations). A lot's future flow is available as a utility for editing common flows, but no lot-specific historical data is available. In addition, if lot-specific special processing is needed, it's specified as an add-on to a standard flow, not as an integrated part of the experiment design. This separation of configuration and execution systems leads to errors in configuration, which can result in misprocessing and reduced throughput. Engineers need to know the latest processing information about a lot when making changes to its flow, especially for experimental lots. Also, unexpected actions can occur during processing, such as wafer loss and rework, which need to be reflected in the configuration system, to provide full contextual information to the engineer configuring changes.

Thus, present MES systems provide separate views of configuration and execution data. Execution data is stored as object-specific history, and configuration data is stored as common structural data. Users are not presented with an integrated environment for making configuration changes in the context of actual execution data.

In addition, current MES systems have very little support for experimental processing configuration. When they do have some support, they assume that the user is adding minor instructions on top of a well-defined flow. Experimental configuration is typically done ad hoc, through off-line processing and paper trails, or through the development of a side-car system to specify experimental processing, but which is not tied to the execution systems. These current systems are highly prone to human error during setup.

BRIEF DESCRIPTION OF THE DRAWINGS

Various features, aspects and advantages will become more thoroughly apparent from the following detailed description, the set of claims, and accompanying drawings in which:

FIG. 6 is a manufacturing operation plan diagram showing an example of operations included in flow plans, lot plans and histories.

FIG. 9 is a screen view showing attribute and manufacturing operations of a pending lot plan having no special processing.

FIG. 10 is a screen view of a pending lot plan having special processing.

FIG. 13 is a screen view of an active lot plan showing non-executed operations and executed operations in a history.

FIG. 16 is a screen view of an active lot plan having all operations completed.

DETAILED DESCRIPTION

Figure 1:
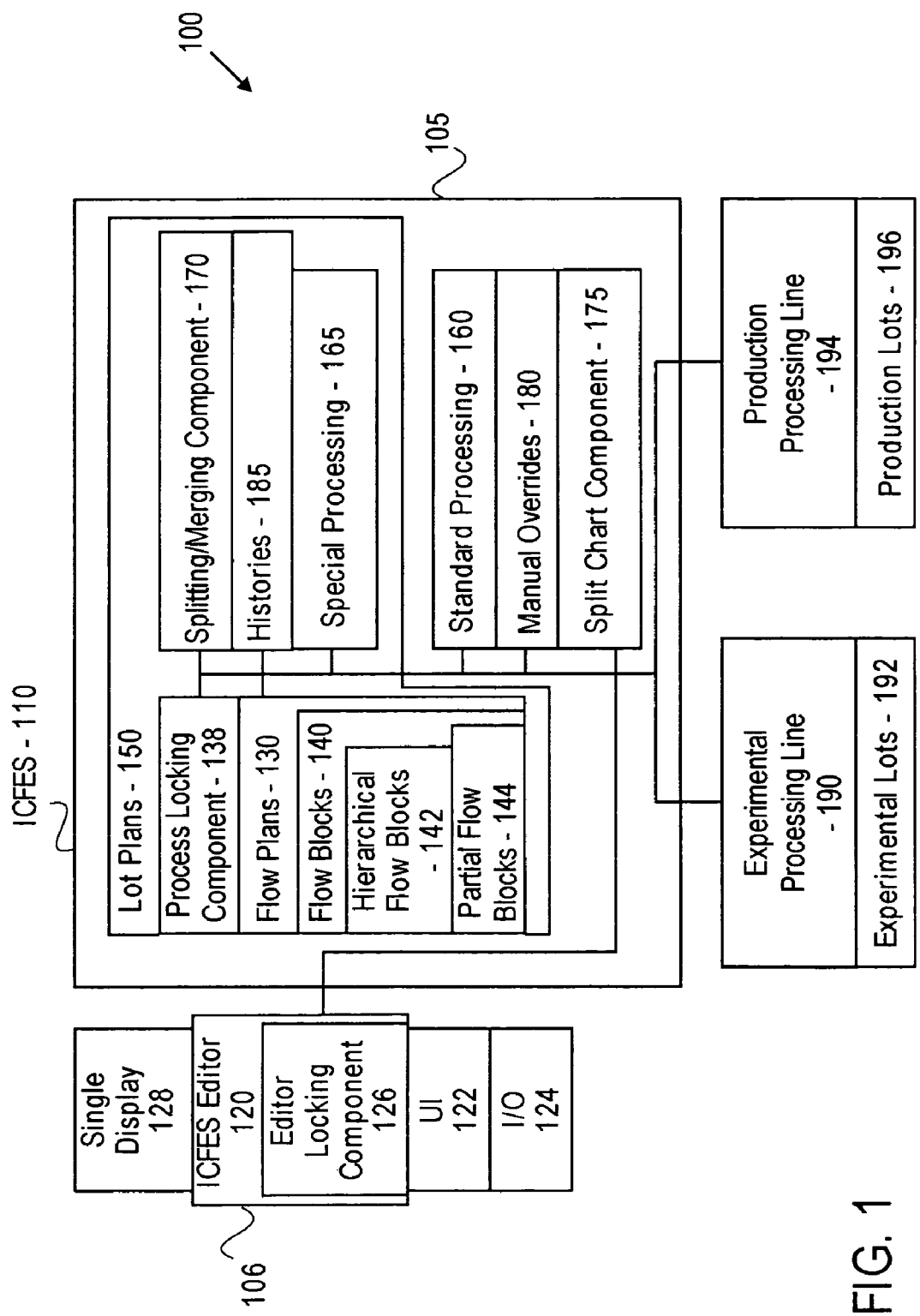
FIG. 1 is a block diagram of an environment including an integrated configuration, flow and execution system (ICFES)

According to some embodiments of the invention, an integrated configuration, flow and execution system (ICFES) may be used to specify, control and record a history of processing (or manufacturing) of semiconductor device manufacturing objects. The ICFES may be integrated in that it defines a model for configuring and tracking an object (e.g., a manufacturing object or a main manufacturing tracking object) while integrating all the required data and functions needed for that object in a single interface (e.g., a single user interface and/or editor). Thus, "integrated" with respect to ICFES may refer to an integrated model and interface for configuring that object, that object's flow (and special processing), and viewing that object's history (e.g., integrating the configuration, flow and execution capabilities into a single user interface).

For instance, ICFES may specify, control and record a history of processing of both experimental lots and production lots of semiconductor device wafers using a single system, according to a flow plans on a single computing device, or using a single software application. Processing or manufacturing of semiconductor device experimental lots and production lots may include performing, processing, or executing manufacturing operations of lot plans derived from flow blocks that combine partial flows of pre-existing flow blocks, and may include special processing. For instance, specifying processing of semiconductor device manufacturing objects may include creating a lot plan, flow plan, and/or flow block having a sequence of manufacturing operations to be executed to create a "physical object". Also, controlling processing of semiconductor device manufacturing objects may include using, updating, and/or manually overriding a lot plan, flow plan, and/or flow block having a sequence of manufacturing operations being executed to create a "physical object". Similarly, recording a history of processing of semiconductor device manufacturing objects may include tracking, identifying, maintaining a list of, maintaining data related to, and/or maintaining results information for a sequence of manufacturing operations of a lot plan, flow plan, and/or flow block specified, controlled and/or executed to create a "physical object". Herein, a "flow" or "flows", without a modifier, may refer to a flow block or a flow plan (e.g., a flow plan including one or more flow blocks). Moreover, the lot plans may be updated to include other partial flows and special processing before or during processing of the lot plan.

When managing flows at a manufacturing facility, there are often standard common flows that are understood by the engineering community to result in certain processing conditions. These standard flows may be short 5 operation blocks of flow (such as those used to describe a common sequence of operations at a module, such as spin-expose-develop sequences used at lithography operations) or they may be much longer flows comprised of 100s of operations, representing standard front-end, back-end or full loop flows. One aspect of the ICFES flow design is that it enables flow specification (e.g., creating or configuring on flow blocks, flow plans, and/or lot plans) by referencing multiple, partial segments of standard flow building blocks. These partial segments are referenced dynamically in an ad hoc manner as desired during experiment configuration, not predefined as static sub components of standard flows. Referencing is important since, by referencing, the data is not copied from the standard flow into the lot flow, rather it maintains a live link to the actual definition of the standard flow. In this way, when the standard flow changes, all flows using that standard flow also change, without need to propagate changes to various copies. Thus, embodiments of this invention address the problem of managing both semiconductor manufacturing technology development and high volume semiconductor production with a single software system, and within the same factory.

For instance, according to some embodiments of the invention, there's a concept of defining a standard flow block that's intended to be used by many manufacturing lots (e.g., experimental and/or production lots). This would be a standard, pre-defined flow (also know as a pre-existing flow). There's a concept of using a whole or partial segment of that flow block when defining a flow for a particular lot. There's a concept of the historical flow—the set of actual operations that the lot processed, and the concept of the flow plan, which is what the lot is intended to follow for the rest of its flow. Specifically, an integrated manufacturing execution system for semiconductor device experimental flows and production flows is proposed. Thus, ICFES may be described as an integrated configuration and execution system.

FIG. 1 is a block diagram of an environment including an integrated configuration, flow and execution system (ICFES). FIG. 1 shows environment 100 including computing device 105 having ICFES 110 and computing device 106 having ICFES editor 120. Devices 105 and 106 may each be an electrically operated machine, computer, or computing system, such as a client device, a server, a personal computer (PC), a workstation, or the like as known in the art. Editor 120 may is shown as a separate component or module with respect to ICFES 110 (e.g., part of the same system or software "package" but executed or operating on a separate computer). Alternately, editor 120 may be a component or module of ICFES 110 (e.g., where editor 120 and ICFES 110 are part of the same system or software "package" and executed or operating on the same computer).

Computing device 106 is coupled to computing device 105 for communication of data, instructions, commands, and/or display information using an "operable connection" in which signals, physical communication flow, data, instructions, results, and/or logical communication may be sent and/or received. It is considered that such an operable connection may include a physical interface, electrical interface, and/or data interface, and may include one or more intermediate entities or electronic devices.

Computing device 105 is coupled to experimental processing line 190 for processing experimental lots 192, and production processing line 194 for processing production lots 196. For example, device 105 and/or ICFES 110 may be coupled to line 190 and line 194 using an operable connection. It can be appreciated that at any point in time either, neither or both lots 192 and/or 196 may be at line 190. Thus, it is possible for ICFES 110 to and/or record a history of manufacturing object processing at line 190 (e.g., processing of experimental lots 192) and/or line 194 (e.g., processing of production lots 196).

Production lots may be characterized by having a large volume of material sharing a common flow specification. Each lot of material has an individual processing history, but shares a planned flow. Changes to standard flows involve mass changes affecting many lots that are in various stages of manufacturing. In addition, experimental lots may be characterized by highly customized and rapidly changing processing operations. Typically each experimental lot has an individual flow with special processing operations within the flow, such as non-standard recipes, between processing instructions, special material splits and merges. Experimental flows typically need to go through a manual review process before executing, to ensure flow integrity is maintained, and no harm or contamination is done to the factory equipment. Experimental flows can be changed frequently, even to the point that a lot's current operation can change as long as the lot hasn't yet begun to process. With these rapidly changing experimental flows, it is usually critical to provide accurate historical flow information to the engineer within the flow editing environment to ensure correct specification.

Integrated configuration, flow and execution system (ICFES) 110, may be a manufacturing execution system (MES) that combines functionality for specifying, controlling and tracking (e.g., recording a history) processing or manufacturing operations of both experimental and production lots of semiconductor device wafers. For instance, ICFES may be described as able to process lots using a single system (e.g., environment 100, devices 105 and 106, ICFES 110, and/or editor 120), according to flow plans on a single computing device (e.g., computing device 105), and/or using a single software application (e.g., ICFES 110, and/or editor 120).

FIG. 1 shows ICFES 110 including lot plans 150, standard processing 160, manual overrides 180, and split chart component 175 each as an entity and coupled to each other. Lot plans 150 includes process locking component 138, flow plans 130, splitting/merging component 170, histories 185, and special processing 165 each as an entity and coupled to each other. Flow plans 130 include flow blocks 140, which are shown including hierarchical flow blocks 142 and partial flow blocks 144 each as an entity and coupled to each other. Each of those entities may be a sub-component or module (e.g., a software component) of ICFES 110 and may be coupled to each other entity by an operable connection. Moreover, each of those components may be connected to line 190 and line 194 by an operable connection. According to some embodiments of the invention, lot plans 150 is an integrated ICFES container for the flow plans 130, special processing 165, histories 185, and locking component 138.

Flow blocks 140 may represent one or more flow blocks for processing manufacturing objects. For example, each of flow blocks 140 may be a pre-existing flow block or flow route, such as a sequence of manufacturing operations that may be a standard common sequence that is used for many manufacturing flows, or a particular flow sequence used for a single manufacturing object. A flow block may include one or more manufacturing operations (or single processes), and each manufacturing operation specifies one or more sets of actions to accomplish a single task (e.g., with respect to processing a lot of semiconductor fabrication wafers). A "task" may include a single task for processing such as creating a processing temperature, pressure, gas volume, fluid volume, vacuum, rotational velocity, and the like, in a processing chamber. A "future" flow block may be described as one that includes operations, which have not yet been executed (although some of its operations may have been executed).

A flow block can contain many operations, which are to be performed or followed using different processing tools. A tool may be a processing device used to create a processing temperature, pressure, gas volume, fluid volume, vacuum, rotational velocity, and the like, including a processing chamber. Each operation is basically a recipe to follow using a particular tool. The recipe may require multiple actions to be performed using the tool. The key point is that an operation is confined to a particular tool, while a flow block can contain many operations, each of which are to be performed using different processing tools.

A manufacturing operation may be a single process of a manufacturing line, specifying a standard set of actions to be performed to accomplish a specific task on a manufacturing object. A manufacturing operation may include standard processing, special processing, historical processing (e.g., an operation from a history), and/or manual overrides, and the like.

For instance, a manufacturing operation may be performed on experimental and/or production lots of manufacturing objects. Both experiment and production lots follow a sequence of operations. A typical "full" flow in the factory is 500 operations. For production lots, their manufacturing flow usually includes 1-3 standard flow blocks (e.g., "routes") in sequence, used by many (1000's) of lots, with no special processing setup. For experimental lots, their manufacturing flow usually includes many, say 5-10 flow blocks, some of which are partial segments of standard flow blocks, and some of which are custom flow blocks (e.g., specific to the experiment).

Figure 5:
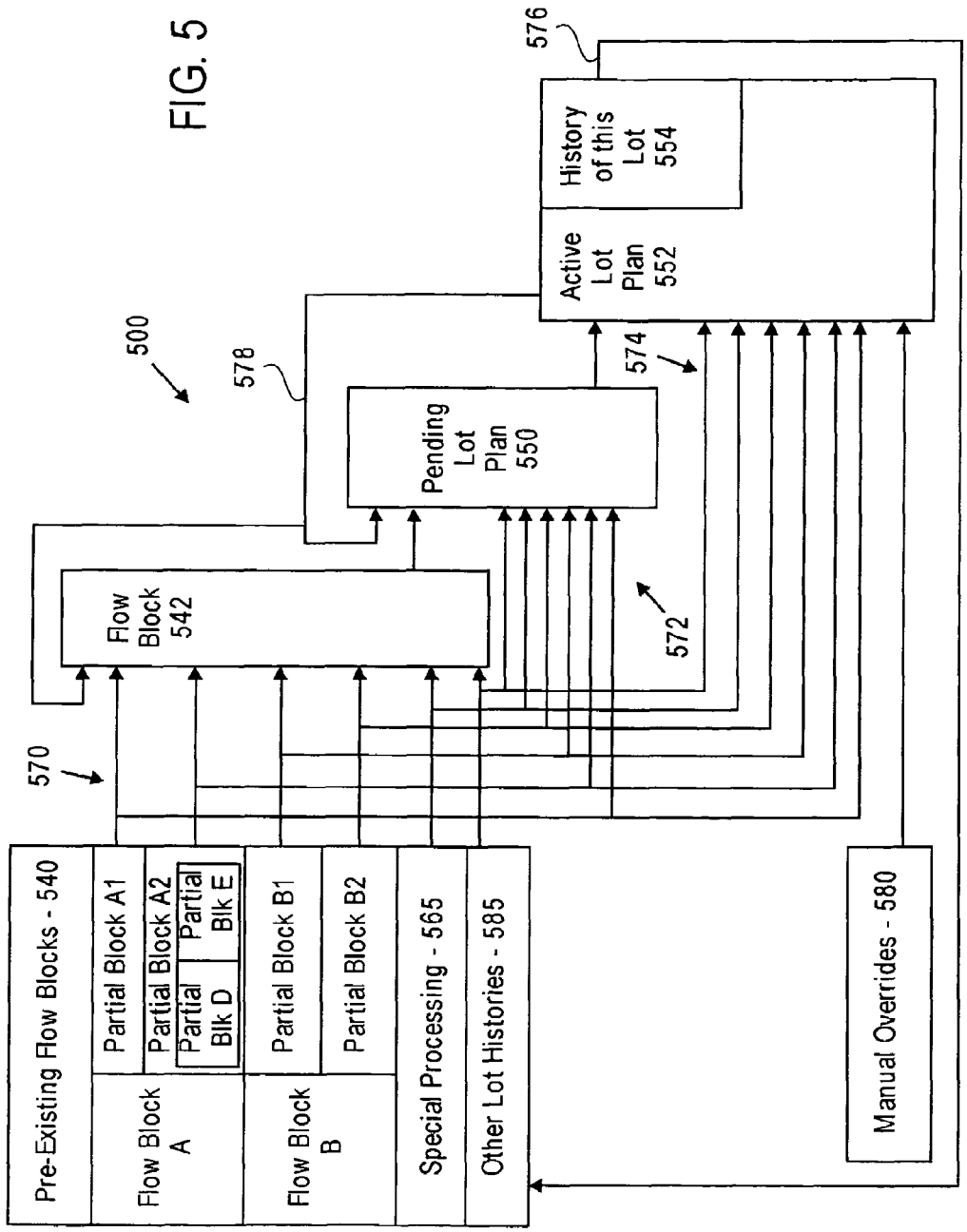
FIG. 5 is a manufacturing operation data diagram showing types of operations that can be added or included in flow blocks, lot plans and histories.
Figure 8:
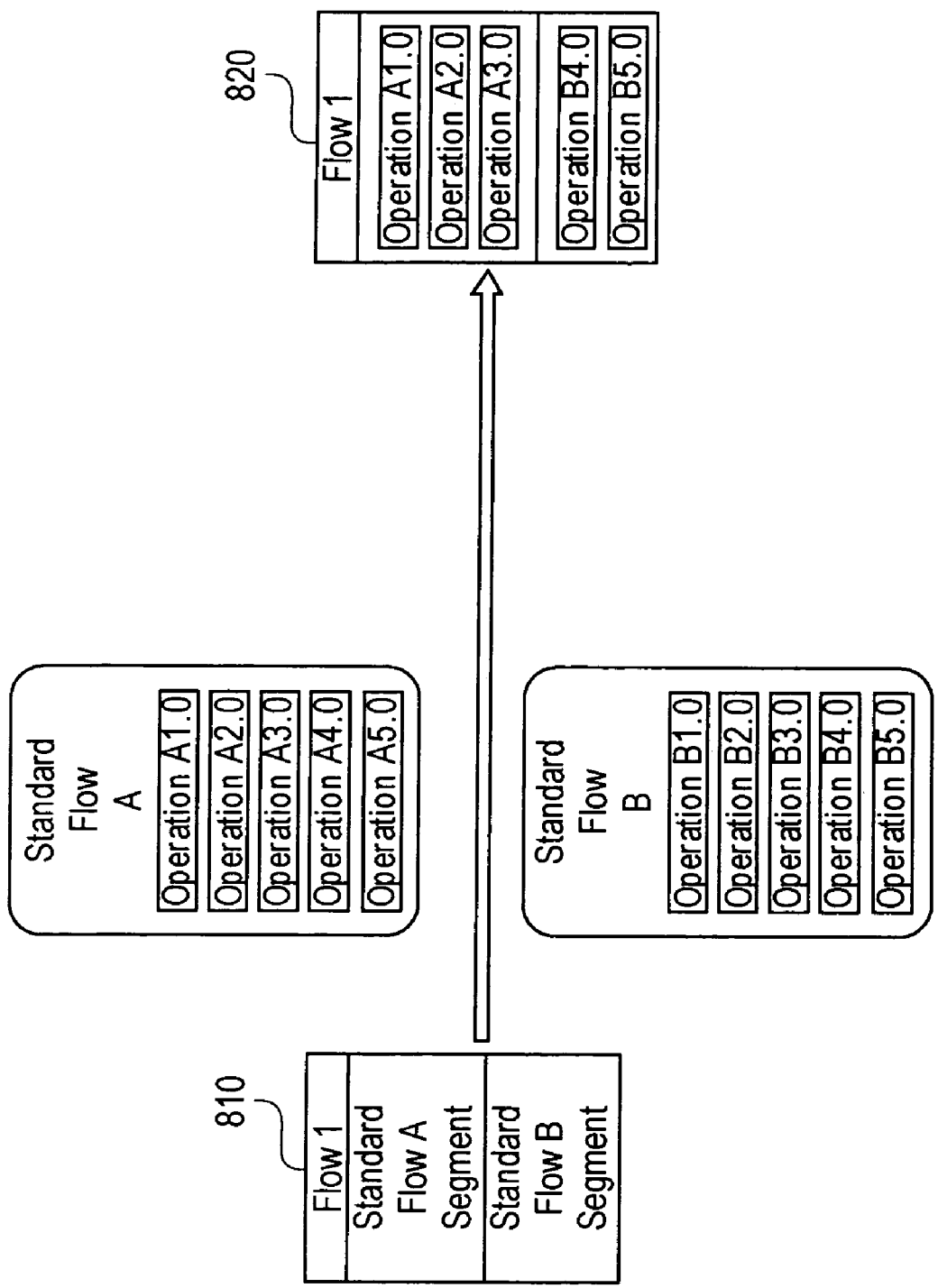
FIG. 8 is a block diagram of lot plan flow data structure referencing multiple partial standard flows.

A block of blocks 140 may reference multiple, partial segments (e.g., partial blocks of blocks 144) of standard flow building blocks (e.g., partial blocks standard processing). Referencing is important since, by referencing, the data is not copied from, for example, a standard flow into the flow block of blocks 140, rather it maintains a live link to the actual definition of the standard flow. In this way, when the standard flow changes, all flows using that standard flow also change, without need to propagate changes to various copies. Thus, ICFES 110 can provide this capability without requiring referencing an entire standard flow component, or copying the portion of the standard flow, thereby duplicating the data. Hence, ICFES may not require that either many permutations of a standard flow be created and maintained, or that many partial copies of the standard flow will exist within other lot-specific flows. FIGS. 5 and 8 further depict the ability to reference partial segments of standard flows.

Hierarchical set of flow blocks 142 refers to the ability to create a pre-existing flow block by defining N tiers of flow blocks, and flow blocks at the tier can be composed of partial or non-partial blocks from tiers i-1, i-2, . . . 1. Thus, set of flow blocks 142 may include partial blocks, such as one or more blocks of partial flow blocks 144.

Partial flow blocks 144 may be one or more partial flows of a pre-existing flow blocks. As such, each of blocks 144 may reference to a sequence of manufacturing operations contained within a pre-existing flow block, and the ability to reuse and reference this subset of the flow block without losing the reference to the entire flow block.

Partial flow blocks 144 are shown between flow blocks 140 and lot plans 150. As such, blocks 144 may be a portion of the flow blocks of a block of flow blocks 140 or of a flow plan of plans 130. In addition, one or more of partial flow blocks 144 may be referred to, accessed by, used in, combined into, or otherwise used to create another flow block (e.g., a flow block of flow blocks 140) and/or a lot plan of lot plans 150. A "future" partial flow block may be described as one that includes operations which have not yet been executed (although some of its operations may have been executed).

Flow plans 130 include one or more flow plans for processing manufacturing objects, experimental lots, and/or production lots. For example, plans 130 may include one ore more future flow plans, preexisting flow plans, or predetermined flow plans including one or more of blocks 140, and/or partial flow blocks 144.

A "future" flow plan may be described as one that includes operations, which have not yet been executed (although some of its operations may have been executed). A semiconductor device processing future flow plan may include several complete or partial pre-existing flow blocks combined together, and may be used for experimental or production lots.

Lot plans 150 may include a number of lot plans, each including, derived from, or based on a flow plan containing pre-existing flow blocks (e.g., blocks of standard processing), manufacturing object specific special processing specifications, and manufacturing object history for a given manufacturing object. The object history includes any manual overrides that have occurred. The future flow blocks and special processing specifications can be edited in place.

A lot plan includes standard processing, standard actions, standard sequences and/or special processing actions to be performed on manufacturing object(s), such as selected or particular lots of wafers. For instance a lot plan may include a flow plan having one or more flow blocks, each flow block including one or more manufacturing operations (or single processes), and each manufacturing operation specifying one or more sets of actions to accomplish a single task.

Thus, a lot plan has a flow, which is a sequence of flow blocks containing operations. A particular operation in the flow specifies a standard "recipe" or set of processing actions. The lot plan can also have special processing specifications and any number of operations that override the standard processing actions for that operation and that specific lot. As the lot is processed through its flow (e.g., a pending lot plan or lot becomes active once operations are executed or processing begins), the lot plan records the history of the operations that have been performed and lists the future operations to be performed.

The lot plan concept integrates flow plans/blocks and special processing instructions, integrates lot history with future flow, and provides an in-situ ability to modify flows for "active" lots being processed (e.g., having operations of their lot plans executed). For example, the combination of ICFES 110, editor 120, and lot plans 150 provides the ability to modify a flow for an active lot by marking a portion of the flow valid and a portion of the flow under construction. For further description, see FIGS. 3, 5, 6, and 15. For instance, this can be accomplished using the process lock component that is described later.

According to some embodiments of the invention, a single editor and/or user interface is used to construct a data model that is the lot plan that allows configuration of custom flows and special processing in a single environment. Moreover, the same editor/user interface can be used to configure a flow plan that's in the lot plan and references segments of standard flow blocks. These partial segments retain the linkage to the complete standard flow block, so that ancillary systems recognize that these flows are segments of standard flows. These segments are not predefined segments, but can be any segment of the standard flow, from as few as one operation to as many as the whole flow block minus one operation.

Here, the lot plan concept (e.g., lot plans and/or flow blocks thereof) enables automatic execution of flows that are comprised of segments of standard flows. Moreover, during processing (e.g., execution of operations of the lot plan) the data model provides an integrated view of historical and future flow to enable efficient mass changes to unexecuted standard flow operations, in production lines, as well as in lot specific custom flows (e.g., used in experimental lines).

Herein, a lot plan may be considered a "pending" lot plan prior to execution of processes or manufacturing operations of that plan. Alternatively, a lot plan may be considered an "active" lot plan once one or more processes or manufacturing operations of that plan are executed. Also, a "future portion" of a lot plan may be described as the operations which have not yet been executed (although some of its operations may have been executed). For instance, a "future portion" of a lot plan may refer to an unexecuted or remaining part of the flow plan (previously future or non-active flow plan now active flow plan since part of it has been executed) or pending lot plan (now active lot plan since part of it has been executed) that a particular lot will need to follow.

Lot histories 185 may include the executed/completed manufacturing operations of the manufacturing object, including notations for standard processing, special processing and manual overrides performed during execution.

Splitting/Merging component 170 may be used to split the lot and its corresponding lot plan during executing (e.g., split an active lot plan) into a first lot plan and a second, third, fourth, etc . . . lot plan for portions of the manufacturing flow (e.g., and/or portions of the manufacturing object or lot as well). The lot plans may be merged back together at later operations in their flows.

Split Chart component 175 may be used to combine the splitting and merging operations of many lot plans into a single view, for integrated editing and tracking of split and merge operations across a family of lot plans.

Standard processing 160 may include standard processing (e.g., one ore more standard processes) which may include a standard or common set of actions to be performed on a manufacturing object at a given manufacturing operation. Processing 160 may also include the action of having a manufacturing object follow a predefined sequence of manufacturing operations, as defined. Standard processing 160 may include standard processing as know in the art.

Special processing 165 (e.g., one ore more special processes) may include a set of unique, non-standard actions to be performed on a manufacturing object. Processing 165 may be actions to be performed at a particular point in time and/or prior to, during, or after a particular manufacturing operation. Special processing 165 may include special processing as know in the art.

Manual overrides 180 includes one or more manual input prior to, during or after performing, processing, or executing a manufacturing operation (e.g., a standard or special process). A manual override may include the action of determining or selecting (e.g., such as manually determining or selecting) the next manufacturing operation for a manufacturing object in conflict with a flow plan, flow block, lot plan, and/or predefined operation defined in a predefined flow block. For instance, a manual override may include initiating rework by repeating one or more manufacturing operations on a manufacturing object or portion of a lot. Also, manual overrides 180 may include manual overrides as know in the art.

ICFES 110 also has process locking component 138 (e.g., a plan processing lock) to stop execution at a particular operation of a future flow plan and/or a future portion of a lot plan. Thus, using component 138, a particular manufacturing operation or special process may be selected and marked (e.g., tagged), and execution of processing of a lot plan for a manufacturing object will be stopped at that operation or process. See FIG. 15 for further description. This capability may be used to enable editing of the flow plan in processes following the process lock. Moreover, a particular manufacturing operation or special process may be selected and marked (e.g., tagged) for a pending or active lot plan.

ICFES editor 120 has user interface (UI) 122 with input output (I/O) 124. UI 122 may be a single user interface. ICFES editor 120 may use menu driven screens and/or "windows" accessible, selectable, manipulated, and into which data input may be made from user interface UI 122 and/or input output I/O 124, as known in the art. Editor 120 also has editor locking component 126 (e.g., a plan editor lock) to prohibit multiple users from simultaneously editing a future flow plan and/or a future portion of a lot plan. Editor 120 also has single display 128.

Editor 120 allows for creation or updating of flow plans 130, flow blocks 140, and lot plans 150, such as by combining partial flow blocks 144 to create flow blocks 140 and/or flow plans 130 which may then be used to create lot plans 150. For instance, editor 120 allows standard processing from processing 160, special processing from processing 165, and partial flow blocks from blocks 144 to be combined into a block of blocks 140, a plan of plans 130, and thereby used in a lot plan of plans 150. Moreover, ICFES editor 120 may be used to update a pending, active, or future portion of a lot plan, wherein updating comprises changing or updating the flow blocks, adding a special process to the lot plan before or during executing processing, and/or adding a manual override to the lot plan during or while executing processing. Specifically, during execution of an active lot plan of plans 150, manual overrides from overrides 180 may be performed using editor 120.

In addition, portions of lot plans of plans 150 or manufacturing operations thereof which have been executed may be viewed as part of histories 185 using editor 120 (e.g., and display 128). Moreover, all of the information and capabilities described above with respect to editor 120 may be displayed on display 128. Similarly, all of the information and capabilities described above with respect to editor 120 may be accessed, selected and/or manipulated by data input from user interface UI 122 and/or input output I/O 124 (e.g., such as by a user manipulating a computer mouse or keyboard of I/O 124).

ICFES editor 120, editor locking component 126, user interface 122, process locking component 138, flow plans 130, flow blocks 140, flow blocks 142, flow blocks 144, lot plans 150, standard processing 160, special processing 165, manual overrides 180, histories 185, splitting/merging component 170, split chart component 175, and/or other components of ICFES 110 may be software components or modules of a software instruction embodiment of ICFES 110.

Figure 2A:
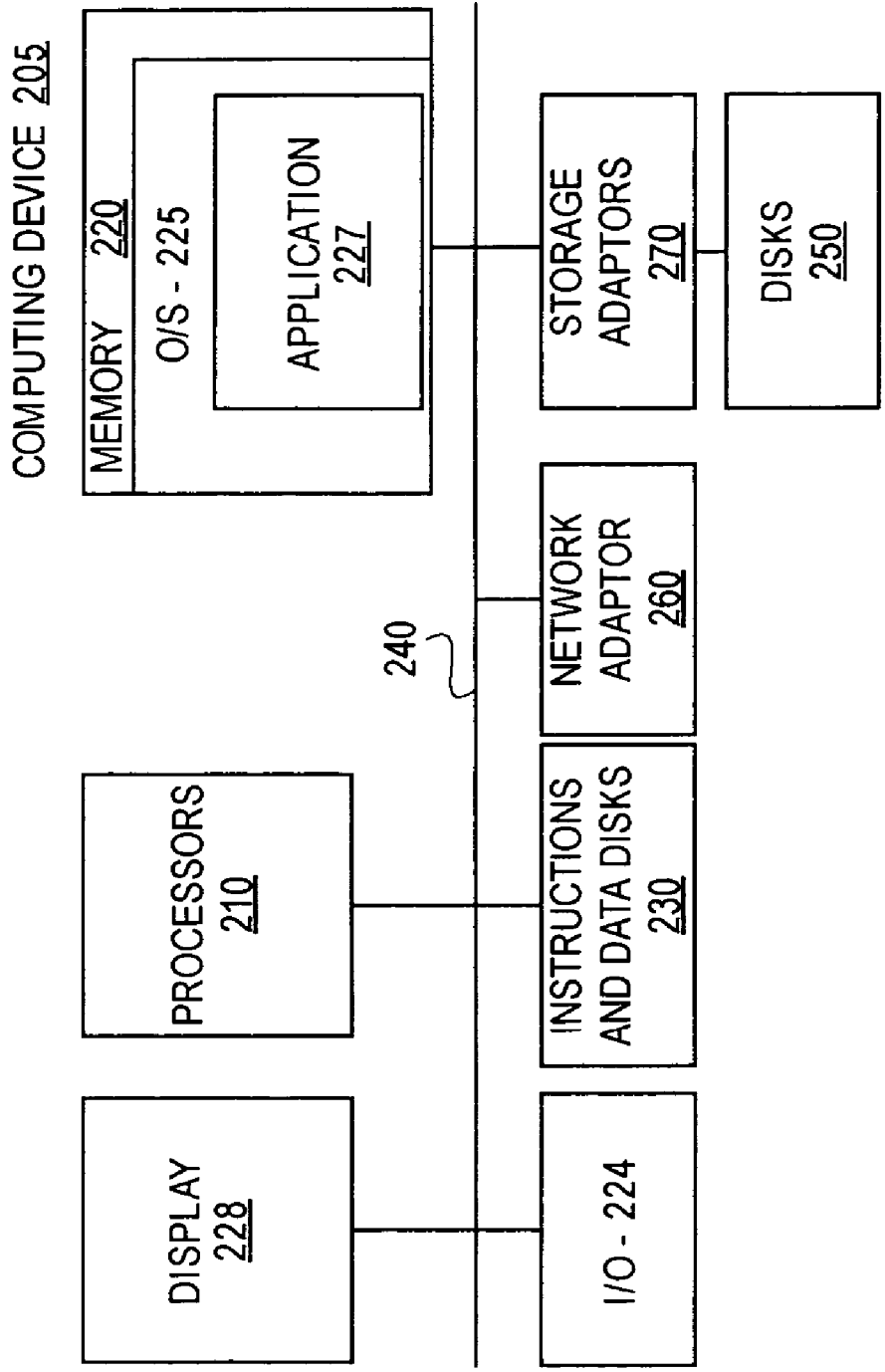
FIG. 2A is a block diagram of a computing system that can be used with an ICFES.

For instance, FIG. 2A is a block diagram of a computing system that can be used with an ICFES. FIG. 2A shows computing device 205 including system bus 240 connecting processors 210, memory 220, network adapter 260, storage adapters 270, instructions and data disks 230, display 228 and input/output I/O 224, such as by an operable connection. Adapters 270 are connected to disks 250, such as by an operable connection. Display 228 may represent a display such as display 128. Likewise, 1/0 224 may represent and input/output such as I/O 124. Certain well known components which are not germane to embodiments of the present invention may not be shown in FIG. 2A.

Device 205 may represent a computing device, computer, and/or the general composition for a single computing machine. Specifically, device 205 may represent device 105 or 106. For example, memory 220, disks 230, disks 250, and/or other computer readable medium may store software (e.g., one or more software applications) including ICFES editor 120 and/or ICFES 110.

"Software", as used herein, includes but is not limited to, one or more computer machine executable or processor instructions that can be read, interpreted, compiled, and/or executed and that cause a computer, machine, or processor, or other electronic device to perform functions, actions and/or behave in a desired manner. Software may also be implemented in a variety of executable and/or loadable forms including, but not limited to, a stand-alone program, a function call (local and/or remote), a servelet, an applet, instructions stored in a memory, part of an operating system or other types of executable instructions.

"Computer-readable medium", as used herein, refers to a medium that participates in directly or indirectly providing signals, instructions and/or data. Common forms of a computer-readable medium include, but are not limited to, a magnetic or optical disk, tape, card or other medium, random access memory (RAM), read only memory (ROM), erasable programmable read only memory (EPROM), or other memory.

Bus 240, shown in FIG. 2A, is an abstraction that represents any one or more separated physical buses and/or point-to-point connections, connected by appropriate bridges, adapters and/or controllers, as known in the art.

Processors 210 may be the central processing units (CPUs) of server 140 and, thus, control and coordinate the overall operation of the server. In certain embodiments of the invention, the processors 210 accomplish this by executing software, such as software stored in memory 220. A processor of processors 210 may be, or may include, one or more programmable general-purpose or special-purpose processors, as known in the art, or a combination of such devices.

Memory 220 may be or include the "main memory" of device 205. Memory 220 represents any form of random access memory (RAM), read-only memory (ROM), flash memory, or the like, as known in the art, or a combination of such devices.

Also connected to processors 210 through bus 240 are instruction and data disks 230. Disks 230 may be one or more internal mass storage devices including any conventional medium for storing large volumes of data in a non-volatile manner, such as one or more magnetic or optical based disks. Disk 230 may contain other instructions and data that are not immediately required by the system in its operations.

Network adapters 260 provide device 205 with the ability to communicate with remote devices, such as devices of line 190 and 192 over a network and may be, for example, an Ethernet adapter or Fibre Channel adapter (e.g., in a local area network (LAN) implementation). Storage adapters 270 allow the server to access storage subsystems, such as disks 250, and may be, for example, a Fibre Channel adapter or a small computer system interface (SCSI) adapter.

Thus, device 205 can communicate with its clients or a server through network adapters 260, and with its mass storage devices (such as disks 250) through storage adapters 270. For instance, storage adapters 270 and network adapters 260 may have hardware (e.g., described herein as an I/O) for communicating data between memory 220, processor 210, disks 230, and/or disks 250 over a network.

Device 205 can communicate similarly with devices of line 190 and 192 when device 205 represents device 105. Also, network adapters 260 and/or bus 240 (e.g., which may have hardware described herein as an I/O) may be used to communicate data between device 205 and devices of line 190 and 192, when device 205 represents device 105.

Disks 250 and/or 230 may include a data storage subsystem or a data storage device including one or more mass storage devices, disk arrays, mass storage devices, and/or other memories, as known in the art.

Memory 220 may include operating system 225. The operating system may include or be built "on top of" a conventional OS, as known in the art. ICFES 110 and/or editor 120 may be software application 227 (e.g., as of one or more software applications) that is part of or running under operating system 225 (e.g., executed by processors 110).

Figure 2B:
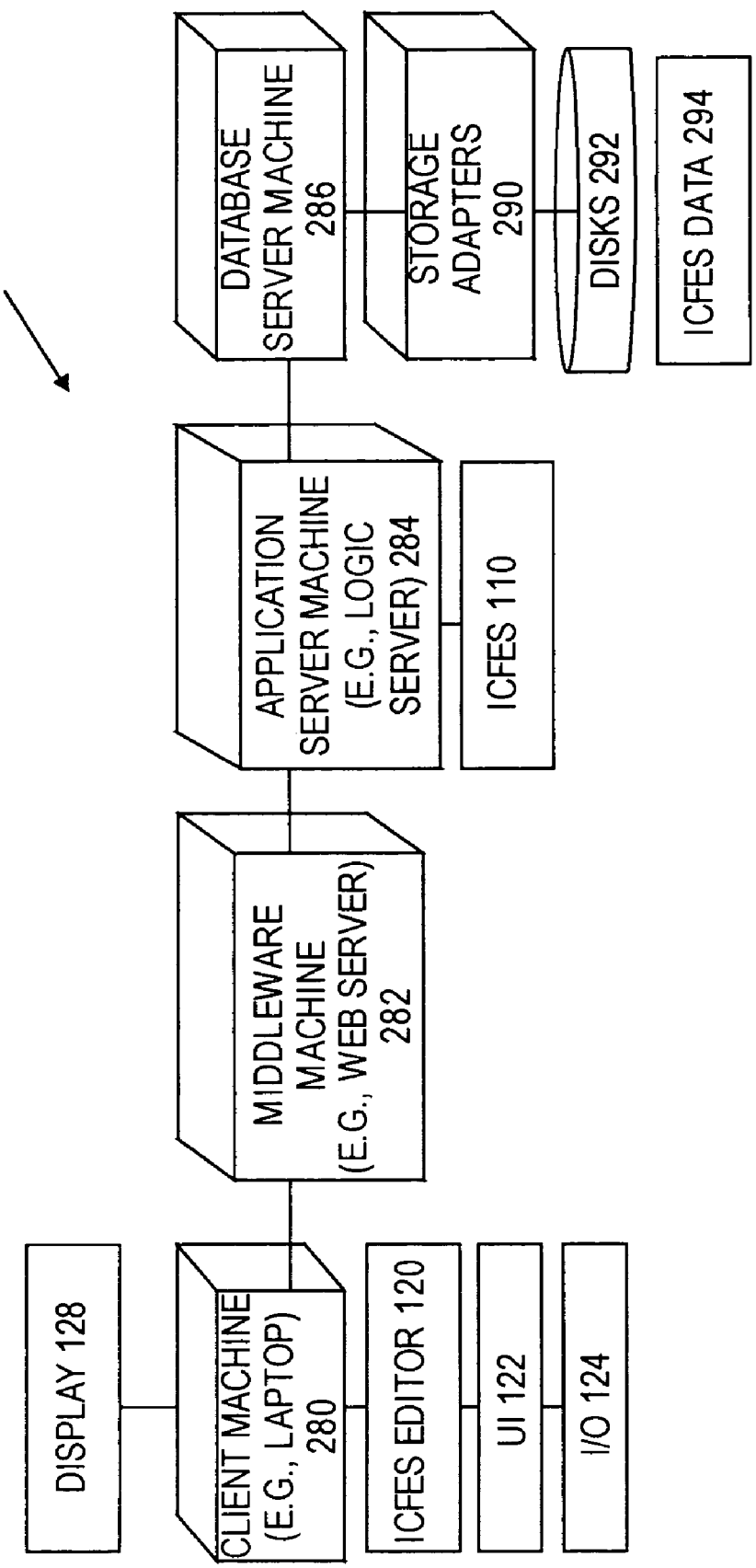
FIG. 2B is a block diagram of a distributed environment that can be used with an ICFES.

For instance, FIG. 2B is a block diagram of a distributed environment that can be used with an ICFES. FIG. 2B shows environment 201 including client machine 280, middleware machine 282, application server machine 284, database server machine 286 connected to each other with an operable connection. For instance, machines 280, 282, 284, and 286 may be connected to communicate with each other using a network, such as local area network (LAN), intranet, the Internet, and/or using an Ethernet adapter or Fibre Channel adapter, or the like. Moreover, machines 280, 282, 284, and 286 may be located and connected to the others from a local and/or remote location. Each of machines 280, 282, 284, and 286 may be a device such as device 205. Client machine 280 may represent device 106, and application server machine 284 (optionally including database server machine 286) may represent device 105. Certain well known components which are not germane to embodiments of the present invention may not be shown in FIG. 2B.

In particular, FIG. 2B shows client machine 280 (such as a laptop computer) connected to display 128, ICFES editor 120, UI 122 and I/O 124 by operable connections. For instance, client machine 280 may represent device 106 or a machine including ICFES editor 120 (e.g., stored in a memory such as memory 220) to be executed by a processor (e.g., processors 210) to specify, control, and record a history of processing during manufacturing of semiconductor devices. ICFES editor 120 may include software instructions to create, combine, and update the flow blocks, flow plans, and lot plans described herein (e.g., provide input or instructions for creating future flow plan); to cause the operations and processing described herein to occur (e.g., provide input or instructions for executing a future flow plan). In addition, client machine 280 may be a computing device including the functionality of a client computer as known in the art.

Also, middleware machine 282, may be a computing device including the functionality of a web server as known in the art. Moreover, some embodiments of the invention may exclude middleware machine 282, such as where machine 280 is connected to machine 284 without machine 282.

FIG. 2B shows application server machine 284 (such as a logic server) connected to ICFES 110 by an operable connection. For instance, application server machine 284 may represent device 105 or a machine including ICFES 110 (e.g., stored in a memory such as memory 220) to be executed by a processor (e.g., processors 210) to specify, control, and record a history of processing during manufacturing of semiconductor devices. ICFES 110 may include software instructions to create, combine, and update the flow blocks, flow plans, and lot plans described herein (e.g., creating future flow plan); to cause the operations and processing described herein to occur (e.g., executing a future flow plan). In some cases, machine 284 includes software to perform the functionality of lot plans 150 (including process locking component 138 and splitting/merging component 170), standard processing 160, manual overrides 180, and split chart component 175. In addition, application server machine 284 may be a computing device including the functionality of an application server machine as known in the art.

FIG. 2B shows database server machine 286 connected to storage adapters 290, and disks 292 by operable connections. Disks 292 include ICFES data 294. Storage adapters 290 may be similar to adapters 270 and disks 292 may be similar to disks 250 of FIG. 2A. For instance, database server machine 286 may data written to and read from machine 286 by editor 120 and/or ICFES 110 for use when specifying, controlling, and recording a history of processing during manufacturing of semiconductor devices. Database server machine 286 may include software instructions and/or data to create, combine, and update the flow blocks, flow plans, and lot plans described herein (e.g., creating future flow plan); to cause the operations and processing described herein to occur (e.g., executing a future flow plan).

In some cases, machine 286 includes data to support or be used to perform the functionality of lot plans 150, standard processing 160, manual overrides 180, and split chart component 175. Specifically, machine 286 may contain plans of lot plans 150, processing of standard processing 160, plans of flow plans 130, histories of histories 185, processing of special processing 165, blocks of flow blocks 140, blocks of hierarchical flow blocks 142, and partial blocks of partial flow blocks 144. In addition, machine 286 may be a computing device including the functionality of a database server as known in the art. For instance, database server machine 286 may be a storage server including mass storage disks (e.g., disks 292) storing data 294 in one or more relational databases, as known in the art.

Specifically, ICFES 110 and/or editor 120 may include software instructions, that when executed make a system, such as one or more machines or computing devices (e.g., device 205), capable of integrating semiconductor device manufacturing flow plans/blocks for experimental lots and production lots. Environment 201 may be a distributed environment where editor 120 (i.e. UI 122) runs on one server (e.g., client machine 280), and others servers contain business logic components of ICFES 110 (e.g., ICFES 110 running server machine 284) that receive commands from editor 120, as well as commands from other user interfaces, such as the execution user interfaces (UI) coupled to processing devices or lines by operable connections. Also, Environment 201 may have a main database that records information across the entire system (e.g., data of ICFES 110 stored on database server machine 286). Thus, editor 120 and/or ICFES 110 may be part of a distributed environment of MES components, running across many servers.

Figure 3:
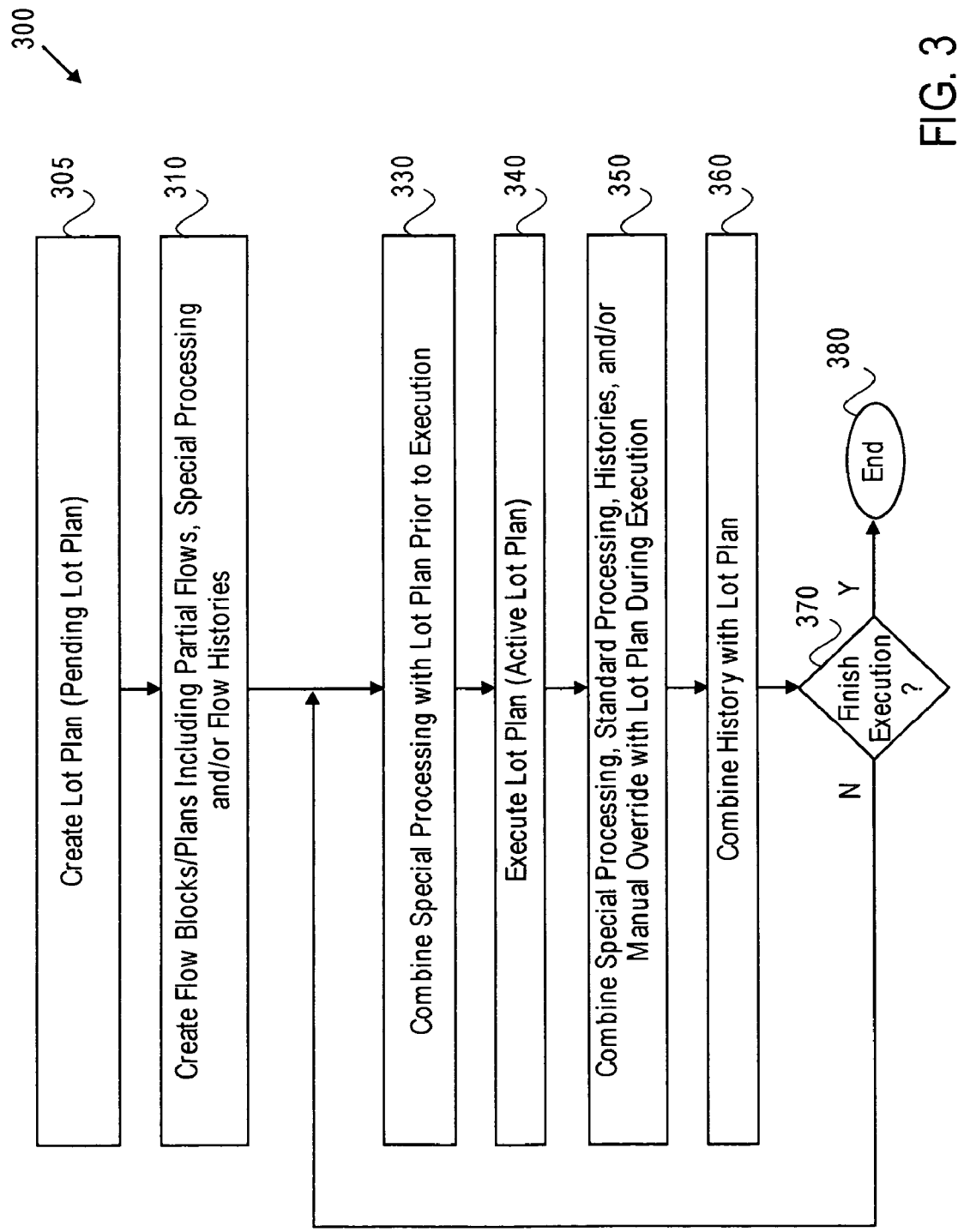
FIG. 3 is an activity diagram of an activity in accordance with an ICFES.

FIG. 3 is an activity diagram of an activity in accordance with an ICFES. FIG. 3 shows activity 300 which may include operations (e.g., which may be part of an activity and/or sub-activities) described above with respect to ICFES 110 and/or editor 120, and/or environment 100. Activity 300 may be used to process experimental and/or production lots.

Activity 300 includes sub-activity 305 at which a lot plan (e.g., of plans 150) is created (e.g., configured, such as by combining) from one or more flow blocks, flow plans and/or special processing (e.g., one or more of blocks 140, plans 130, blocks 144, histories 185, standard processing 160, special processing 165, blocks of a pre-existing flow plan, and/or operations of a pre-existing flow block). Activity 305 may include referring to full or partial flow blocks and creating a lot plan as described above with respect to lot plans 150, partial blocks 144, ICFES 110, and/or editor 120.

According to some embodiments of the invention, creating a lot plan (e.g., of plans 150) may include reference to one or more partial segments (e.g., partial blocks of blocks 144, blocks 140, plans 130, histories 185, standard processing 160, and/or special processing 165) as well as reference to one or more full segments of blocks (e.g. full blocks of blocks 140, plans 130, blocks 144, histories 185, standard processing 160, and/or special processing 165). By referencing, the data is not copied from a partial or full block into the lot plan, rather it maintains a live link to the actual definition of the flow block. In this way, when the flow block changes, all flows using that flow block also change, without need to propagate changes to various copies. Thus, the lot plan can be created without requiring referencing an entire standard flow component (e.g., flow plan), or copying the portion of the standard flow block (in which case any reference to the original flow blocks may be lost), thereby duplicating the data. Moreover, the lot plan can be created by selecting and combining partial or full segments of flow blocks having boundaries (e.g., first and last operations of the block) that do not align. In other words, full flow blocks can be selected and portions (e.g., sub-blocks) of those flow block can be selected and combined regardless of whether the boundaries of the full flow blocks align.

The lot plan created at sub-activity 305 is a pending lot plan (e.g., prior to execution of processes or manufacturing operations of that plan). In some cases, sub-activity 305 may describe creating a "empty" lot plan (e.g., a lot plan that has no flow plans configured within it). Here, sub-activity 305 may include configuring main attributes of a lot plan (e.g., see attributes 870 of FIG. 9). The lot plan can then be configured by configuring flow plans (e.g., referencing standard processing, flow blocks, flow plans, histories, and the like. Creating a lot plan at sub-activity 305 may be performed using a single editor (e.g., editor 120) and/or using a single user interface (e.g., UI 122).

Next, at sub-activity 310 flow blocks or plans (e.g., such as a block of blocks 140 or plan of plans 130) are created (e.g., configured). A flow block or flow plan may be created by combining one or more partial flows (e.g., such as one or more of blocks 144, standard processing 160, blocks of a pre-existing flow plan, and/or operations of a pre-existing flow block), special processing (e.g., processing 165), and/or portions of previous flow histories (e.g., of histories 185). Sub-activity 310 may include referring to full or partial flow blocks and creating flow plans and flow blocks as described above with respect to flow plans 130, flow blocks 140, partial blocks 144, special processing 165, ICFES 110 and/or editor 120. Flow blocks or flow plans created at sub-activity 310 may be future flow plans or flow blocks.

Similar to the description above for sub-activity 305, creating a flow block (e.g., of blocks 140) may include reference to one or more partial segments (e.g., partial blocks of blocks 144, blocks 140, plans 130, histories 185, standard processing 160, and/or special processing 165) as well as reference to one or more full segments of blocks (e.g. full blocks of blocks 140, plans 130, blocks 144, histories 185, standard processing 160, and/or special processing 165). By referencing, the data is not copied from a partial or full block into the flow block, rather it maintains a live link to the actual definition of the flow block. In this way, when the flow block changes, all flows using that flow block also change, without need to propagate changes to various copies. Thus, the flow block can be created without requiring referencing an entire standard flow component, or copying the portion of the standard flow block, thereby duplicating the data. Moreover, the flow block can be created by selecting and combining partial or full segments of flow blocks having boundaries that do not align.

Also, similar to sub-activity 305, creating a flow block at sub-activity 310 may be performed using a single editor (e.g., editor 120) and/or using a single user interface (e.g., UI 122). Thus, ICFES 110 and/or editor 120 provides the referencing, combining and/or specification of special processing and flow definition into or using a single UI (e.g., to create a lot plan and/or flow block), rather than defining flows in one UI, and special processing in another.

Thus, according to some embodiments of the invention, the lot plan is created first, then the flow (block or plan) is configured within that lot plan, including the use of partial flows. This creates a flow plan "within" the lot plan. Special processing can be added to the flow plan. In some cases sub-activity 320 may be described as creating a flow plan within a lot plan by specifying partial or complete flow blocks.

At sub-activity 330, special processing (e.g., processing 165) may be combined with the lot plan prior to execution (e.g., may be combined with the pending lot plan). Sub-activity may include combining special processing with a lot plan as described above with respect to special processing 165, plans 150, ICFES 110 and/or editor 120. Providing the capability to combine special processing prior to execution of a lot plan provides a more flexible and efficient lot plan by allowing processing other than standard processing or a processing already part of blocks 140 or 144 to be added to a lot plan prior to execution. Specifically, this capability allows for a lot plan to be tailored such that in some cases the lot plan only needs to be interrupted with manual overrides when something unforeseen, unexpected, or being contemplation prior to execution of the lot plan occurs during execution. In this case, during execution a manual override may be made to correct for the unknown situation. Lot plans combined with special processing at sub-activity 330 may be pending lot plans. In some cases sub-activity 330 may be described as configuring special processing within a lot plan prior to execution.

Moreover, using ICFES 110, the capability at sub-activity 305 and/or 330 may be provided to an active lot plan, such as during execution of processing or manufacturing operations of a lot plan. For example, at sub-activity 340 the lot plan (e.g., a lot plan of plans 150) is executed such as to cause manufacturing operations or processing to be performed on a manufacturing object or lot. Block 340 may include executing a plan of plans 150 to cause processing or manufacturing operations at line 190 on lots 192 or at line 194 on lots 196.

Next, at sub-activity 350 special processing (e.g., processing 165), standard processing (e.g., processing 160), histories (e.g., histories 185), and/or manual overrides (e.g., overrides 180) may be combined with the lot plan during execution. Sub-activity 350 may include combining special processing as described above with respect to sub-activity 310 or 330. Likewise, combining standard processing may include descriptions above with respect to combining processing at sub-activity 310. Combining histories may include descriptions of combining histories at sub-activity 310. Also, a manual override may be made or combined with the lot plan during execution, including as described above with respect to manual overrides 180, ICFES 110 and/or editor 120. Lot plans combined with special processing, standard processing, histories, and/or manual overrides at sub-activity 350 may be or include a future portion of a lot plan.

It can be appreciated that sub-activity 350 allows for an increased flexibility, efficiency, and volume in versatility of accessibly manufacturing operations before and during processing of manufacturing objects (e.g., such as according to activity 300). Specifically, sub-activity 350 provides these capabilities during execution of a lot plan on an experimental lot, such as to provide access to manufacturing operations from flow plans, flow blocks, partial flow blocks, standard processing, special processing, histories, and manual overrides in order to more quickly, effectively, and efficiently create a satisfactory or sufficient experimental lot plan that may be subsequently used for production flow or lots. It is considered that the capabilities of sub-activity 350 may be provided using a single user interface, and/or editor (e.g., editor 120). During processing of production lots sub-activity 350 provides the same capabilities.

At sub-activity 360 a history for the processing or manufacturing operations performed on the manufacturing object by the active lot plan is created and/or automatically (e.g., by ICFES 110 without user intervention during processing) combined with the active lot plan (e.g., such as to be displayed as part of the active lot plan on a single display). For example, sub-activity 360 may include combining the processing, manufacturing operations, and manual overrides performed on an experimental or production lot with the non-executed manufacturing operations of the active lot plan to define, create, or display an active lot plan that includes a history of the processing, operations, and overrides already executed. Sub-activity 360 may include creating and/or combining a history with a lot plan as described with respect to histories 185, lot plans 150, ICFES 110, and/or editor 120.

Next, at decision sub-activity 370 it is determined whether execution of processing or operations of the active lot plan is complete. If at sub-activity 370, execution is not complete, activity 300 returns to sub-activity 330. Alternatively, if at decision sub-activity 370, execution is complete, activity 300 may continue to sub-activity 380 and end. Sub-activity 370 may include determining whether all standard processing, special processing, manual overrides, or other processing or operations of a lot plan have been completed.

Sub-activity 370 may include automatically determining whether or not execution is finished, such as by a determination made by ICFES 110, without user intervention during processing). Alternatively, sub-activity 370 may include a determination that execution is completed by a manual input or manual override. Sub-activity 370 may include manually determining whether or not execution is finished, such as by a determination made by a user and input to ICFES 110, using editor 120. It is considered that if execution is not finished at sub-activity 370, activity 300 may return to sub-activity 340 instead of sub-activity 330.

It is also considered that sub-activities of activity 300 may include displaying flow plans, flow blocks, hierarchical flow blocks, partial flow blocks, lot plans, component 170, component 175, processing 160, processing 165, overrides 180, histories 185, as well as other processing information on a single display (e.g., such as display 128), such as to allow for editing by editor 120. Moreover, sub-activities of activity 300 may include editor locking by editor locking component 126, input/output by I/O 124, user interface by UI 122, and/or process locking by process locking component 138. Moreover, activity 300 may include more, less, and/or other activities than those shown.

Figure 4:
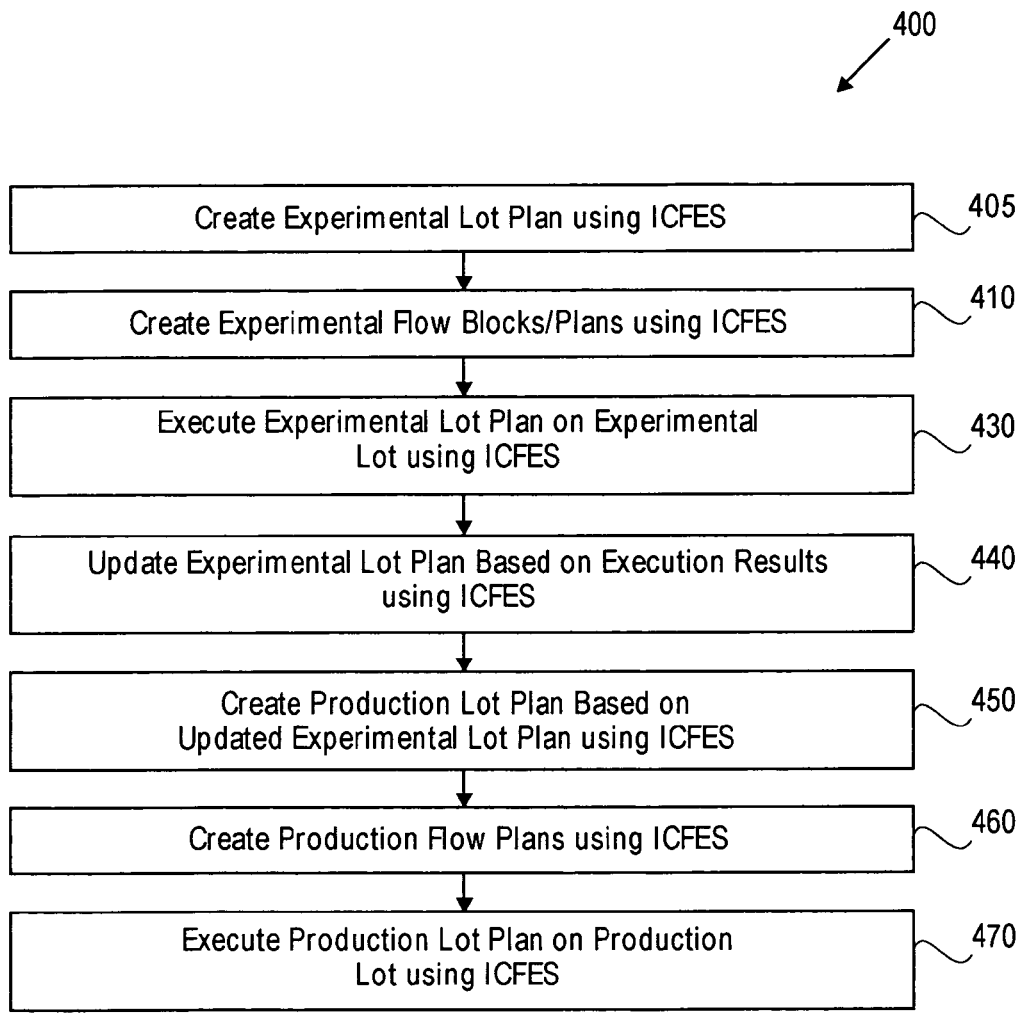
FIG. 4 is an activity diagram of an activity in accordance with an ICFES.

FIG. 4 is an activity diagram of an activity in accordance with an ICFES. FIG. 4 shows activity 400 which may include operations described above with respect to ICFES 110 and/or editor 120, environment 100, and/or activity 300. Activity 400 may be used to process experimental and production lots. Activity 400 includes sub-activity 405 at which an experimental lot plan may be created using ICFES (e.g., a lot plan to process a lot of experimental lot 192, such as using line 190). Sub-activity 405 may include creating a lot plan for an experimental lot, including descriptions above with respect to a creating a lot plan using ICFES 110, using editor 120, for lot plans 150, and/or according to sub-activity 305 of FIG. 3.

At sub-activity 410, an experimental flow block or plan may be created using ICFES. For instance, sub-activity 410 may include creating an experimental flow block or plan using ICFES 110 and/or editor 120 as described herein (e.g., a flow plan or flow block to process a lot of experimental lot 192, such as using line 190). Sub-activity 410 may include creating an experimental flow block or plan as described above with respect to creating a flow block or plan for flow blocks 140, flow plans 130, or at sub-activity 310 of FIG. 3.

At sub-activity 430, the experimental lot plan is executed to process an experimental lot using ICFES. Sub-activity 430 may include executing a lot plan on an experimental lot (e.g., a lot of experimental lot 192, such as using line 190) as described above with respect to ICFES 110, editor 120, lot plans 150, line 190, lot 192, and/or sub-activity 340 of FIG. 3. In addition sub-activity 430 may include creating a history and/or combining a history with an active lot plan as described above with respect to ICFES 110, editor 120, lot plans 150, histories 185; and/or sub-activities 340,350, 360, 370, and/or 380 of FIG. 3 to process or perform operations on an experimental lot.

At sub-activity 440, the experimental lot plan is updated based on execution results, using ICFES 110 and/or editor 120. Sub-activity 440 may include updating a lot plan by combining partial flow blocks, special processing, standard processing, histories, and/or manual overrides with a the lot plan executed at sub-activity 430 to create or update a future portion of a lot plan as described above with respect to ICFES 110, editor 120, lot plans 150, sub-activity 330, sub-activity 340, and/or sub-activity 350. According to some embodiments of the invention, any or all of sub-activities 405-440 may be repeated to update the lot plan until the experimental lot plan is satisfactory or sufficient for processing a production object or lot.

Moreover, ICFES 110 may allow a satisfactory or sufficient lot plan (e.g., an "experimental" lot plan developed by processing an experimental lot) to be used to process a production manufacturing object without a separately configured experimental MES flow and production MES flow. For instance, next, at sub-activity 450 a production lot plan (e.g., a lot plan to process a lot of production lot 196, such as using line 194) may be created based on the updated experimental lot plan of sub-activity 440 using ICFES. In some cases, using ICFES 110, the updated experimental plan may be sufficient to use, as is, on a production lot. Alternatively, the updated plan may be sufficient to use operations and/or blocks of the updated plan, using editor 120, to create a production flow block or a production flow plan based on the experimental flow or processing (e.g., without configuring a separate production flow using a different editor than editor 120). Specifically, flow blocks of the updated plan can be referenced, used, or copied as flow blocks of a production flow plan or lot plan using ICFES 110, a single editor (editor 120) and a single user interface (UI 122). Thus, using ICFES 110, single editor 120, and/or single user interface UI 122, it may not be necessary to use more than one editor to create new experimental flows and specify non-standard processing (e.g., to function as an integrated flow and special processing editor) for those experimental flows (e.g., for experiments that are thought to only consist of special processing instructions overlaid on predefined flows), perform experimental flow changes to the experimental flow during processing (e.g., to define special instructions to ensure the lot doesn't continue processing past the point of the flow edits), access the history of the experimental flow (e.g., to review the processing of the lot while editing the future flow), and to update the flow according to the experimental flow changes (e.g., to adjust the lot and the experiment from the old version of its flow to the new version of its flow). For example, the updated flow can be created to process a production manufacturing object.

Here, use of the terms "based on" includes referencing, using, or copying a flow block or partial flow block of the experimental lot plan or flow plan into a production flow block, partial block, lot plan or flow plan. Moreover, "based on" may include considering or accounting for knowledge, and/or results from sub-activities 430 and/or 440 when creating a production lot plan at sub-activity 450. Alternatively, "based on" may exclude a separately configured experimental MES flow and production MES flow.

Specifically, sub-activity 450 provides the capabilities to more quickly, effectively, and efficiently create a production lot plan based on manufacturing operations from experimental flow plans, experimental flow blocks, experimental partial flow blocks, experimental standard processing, experimental special processing, experimental histories, and experimental manual overrides.

In some cases, sub-activity 450 may include creating a lot plan as described above with respect to ICFES 110, editor 120, flow plans 130, flow blocks 140, sub-activity 405, and/or sub-activity 305 of FIG. 3. For one or more production lots or production manufacturing objects, for instance, sub-activity 450 may include creating a production lot plan to process productions lot 196 using line 194.

At sub-activity 460 a production flow plan and/or flow block is created using ICFES. Sub-activity 460 may include creating a flow plan and/or flow block (e.g., a flow plan and/or flow block to process a lot of production lot 196, such as using line 194) as described above with respect to ICFES 110, editor 120, lot plans 150, sub-activity 410, sub-activity 310 of FIG. 3, and/or sub-activity 330 of FIG. 3.

At sub-activity 470 the production lot plan is executed on a production lot using ICFES. For example, sub-activity 470 may include executing a production lot plan to process lot 196 using line 194. Sub-activity 470 may include executing a lot plan as described above with respect to ICFES 110, editor 120, plans 150, line 194, lots 196, sub-activity 430; sub-activities 330, 340, 350, 360, 370, and/or 380 of FIG. 3 to process or perform operations on a production lot.

Processing of production lots at sub-activity 470 provides similar capabilities to those described above for creating operational flows from experimental flows at sub-activities 450 and/or 460-(e.g., sub-activity 470 provides capabilities to for creating subsequent production or experimental flows based on the production flow).

It can be appreciated that activity 400 allows for an increased flexibility, efficiency, and volume in versatility of accessibly manufacturing operations by allowing users, engineers, and operators to use one system, computing device, and/or software program to process an experimental lot until operations of an experimental lot plan are sufficient to be used as a base of a production flow. Moreover, activity 400 may include more, less, and/or other activities than those shown.

FIG. 5 is a manufacturing operation data diagram showing types of operations that can be added or included in flow blocks, lot plans and histories. FIG. 5 may apply or be used to process experimental and/or production lots. FIG. 5 shows data diagram 500 including pre-existing flow blocks 540, manual overrides 580, flow block 542, pending lot plan 550, and active lot plan 552 including history of this lot 554. Blocks 540 includes flow block A having partial block A1, and partial block A2. Partial block A2 includes partial block D and partial block E. Blocks 540 also include flow block B having partial block B1 and partial block B2. Partial block A2 shows that a partial block may include portions of other blocks or partial blocks, such as by including partial block D and partial block E. Note that partial blocks D and E may be dynamic references to segments of whole blocks, and not copies or predefined components of whole blocks. Flow blocks 540 may include descriptions herein for flow blocks or flow plans, such as by including descriptions with respect to flow blocks 140 or flow plans 130 of FIG. 1.

FIG. 5 shows special processing 565, other lot histories 585 and manual overrides 580. Special processing 565, other lot histories 585 and manual overrides 580 may include descriptions herein with respect to histories and overrides, such as by including descriptions with respect processing 165, histories 185 and overrides 180 of FIG. 1, respectively.

Data diagram 500 shows arrows 570 indicating that blocks of blocks 540, special processing 565, and histories 858 may be included in or combined into flow block 542, such as by combining them during creation or updating of block 542. Flow block 542 may include descriptions herein with respect to flow blocks and flow plans, such as descriptions with respect to flow plans 130 and flow blocks 140.

Data diagram 500 also shows arrows 572 indicating that blocks of blocks 540, special processing 565, histories 585, and flow block 542 may be included in or combined into pending lot plan 550 (e.g., plan 550 may be based on those blocks, processing, and/or histories). For example, lot plan 550 may be based on block 542 updated (e.g., combined with)

with blocks, processing and/or histories of one or more of blocks 540, processing 565, and/or histories 585. Pending lot plan 550 may include descriptions herein with respect to lot plans or pending lot plans, such as those for plans 150 of FIG. 1 and sub-activities 305 and 330 of FIG. 3.

Next, data diagram 500 shows active lot plan 552 which is lot plan 550 once processing or execution of operations of plan 550 begins. Arrows 574 shows that active lot plan 552 may be updated with blocks of block 540, processing 565, histories 585, and/or manual overrides 580. Active lot plan 552 includes history 554, such as history of processing or operations that have been executed from plan 552. Thus, history 554 may include a history of an executed processor operation of blocks 540, processing 565, histories 585, or overrides 580. Active lot plan 552 may include descriptions herein with respect to lot plans, such as those with respect to lot plans 150 of FIG. 1 and sub-activities 340-380 of FIG. 3. Histories 554 may include descriptions with respect to histories herein, such as with respect to histories 185 of FIG. 1 and sub-activity 360 of FIG. 3.

Data diagram 500 also includes arrow 576 indicating that history 554 may be used as one of the other lot histories 585, such as to be included in blocks 542, plan 550, or accessed to update plan 552 (e.g., updated with an executed process, operation, or override of plan 552 that is now in history 554). Likewise, data diagram 500 shows arrow 578 including that a not yet executed block, process, history, or operation of plan 552 may be used to create or update block 542 or plan 550. Thus, data diagram 500 shows the flexibility, versatility (access to blocks, processing, histories, plans and overrides) of ICFES 110.

FIG. 6 is a manufacturing operation plan diagram showing an example of operations included in flow plans, lot plans and histories. FIG. 6 may apply or be an example for processing experimental and/or production lots, that may or may not be according to activity 300, activity 400, and/or data diagram 500. FIG. 6 shows plan diagram 600 including flow plan 602, pending lot plan 604, and active lot plan 606. Active lot plan 606 includes non-executed active lot plan 626 and history 616. Flow plan 602 may correspond with flow plans or flow blocks described herein, such as by being a flow plan that includes one or more of flow blocks of 542 of FIG. 5. Similarly, pending lot plan 604 may be a lot plan as described herein, such as by including descriptions with respect to lot plan 550 of FIG. 5. Also, active lot plan 606 may include descriptions for active lot plans herein, such as by including descriptions with respect to plan 552 of FIG. 5.

An example according to FIG. 6, starts with a standard flow block (e.g., a block of flow blocks 140 that may be from standard processing 160 of FIG. 1) called StdFB_A (this flow block may be considered a pre-existing or future block, or may be created, such as according to sub-activity 310 of FIG. 3). It contains operations 10, 20, 30, 40, 50 and can be used to create a production or experimental lot flow (e.g., a block of flow blocks 140 to be used to process and experimental lot or manufacturing object, such as a lot of experimental lots 192, using line 190 of FIG. 1). To create the experimental flow, a lot plan (e.g., a plan of lot plans 150 of FIG. 1) for the experiment is created (e.g. part of sub-activity 305 of FIG. 3), including or using a segment (e.g., a partial flow or a portion of flow block StdFB_A, or a partial flow block of partial flow blocks 144 of FIG. 1) of this flow block, say 10, 20, 30.

To create our experimental flow, another unique experimental flow block is created to be combined with StdFB_A (e.g., a block of flow blocks 140 that may not be from standard processing 160 of FIG. 1) called ExptyFB_B (this flow block may be considered a future block, created, such as according to sub-activity 310 of FIG. 3). This flow block contains operations 41, 51, 61, and 71 (e.g., a flow block, such as of flow blocks 140 of FIG. 1).

The partial and created blocks are combined or put together (e.g., to create another future block, such as according to sub-activity 310 of FIG. 3) to create a flow plan (e.g., that includes the experimental block). The flow plan is shown in FIG. 6 as flow plan 602. It is called FlowPlan_Expt1001, and includes operations 10, 20, 30, 41, 51, 61, and 71.

A lot plan (e.g., a plan of lot plans 150 of FIG. 1), LotPlan_Expt1001, is created (e.g., create, such as according to sub-activity 305 of FIG. 3) using, according to, or based on FlowPlan_Expt1001. The Flow Plan refers to the entire flow in LotPlan_Expt1001. LotPlan_Expt1001 is made up of 2 flow blocks, one a partial segment of a standard flow block (StdFB_A), and the other a unique experiment flow block (ExptFB_B). Then the lot plan is combined with or updated with special processing (e.g., combined with or updated, such as according to sub-activity 330 of FIG. 3). A special processing instruction is specified at operation 30. The lot plan is shown in FIG. 6 as lot plan 604. It is pending at this point as none of its operations have been executed or performed. It is called LotPlan_Expt1001, and includes operations 10, 20, 30 (the special processing instruction at operation 30) 41, 51, 61, and 71.

Next, the lot plan is used to process and experimental lot or manufacturing object (such as a lot of experimental lots 192, using line 190 of FIG. 1, according to, using or following this lot plan). First, operations 10 and 20 are executed or performed (e.g., to execute the lot plan, such as according to sub-activity 340 of FIG. 3), to process the lot with standard processing or operations. Once processing begins (e.g., during or after operation 10 is performed), the lot plan becomes an active lot plan.

After operation 10, the lot plan will have a history including the executed operation 10 (e.g., skip sub-activity 350 of FIG. 3 and create a history, such as according to sub-activity 360 of FIG. 3).

Operation 20 is then performed (e.g., not finished executing at sub-activity 370, return to sub-activity 330 and perform another loop through sub-activities 330-370, skipping sub-activity 330 of FIG. 3) similar to operation 10.

Now, operation 30 of the lot plan is performed with the special processing (e.g., not finished executing at sub-activity 370, return to sub-activity 330, skip sub-activity 330 of FIG. 3, and perform sub-activity 340 of FIG. 3). The special processing may be performed, automatically, according to the active lot plan, without user intervention or input once the active lot plan has started. The history is updated and operations continue.

At this point, operation 41 may be performed with standard processing (e.g., perform another loop, according to the active lot plan), without having to manually override the flow to go from StdFB_A/300 to ExptFB_B 401 (e.g., skip sub-activity 330, and to include the manual override perform sub-activity 350 of FIG. 3). Specifically, the created, experimental operation may be performed automatically, according to the active lot plan, without user intervention or input once the active lot plan has started.

Similarly operation 51 may be performed with standard processing (another loop).

However, next, it is realized (e.g., by an operator, computing system, test equipment, monitor, and/or the like) that rework of the lot is desired to redo operations 41 and 51. The rework can be done by initiating or causing a manual override after the fist time operation 51 is performed (e.g., perform sub-activity 340 to do operation 51, then perform a manual override at sub-activity 350 of FIG. 3). Rework is one kind of manual override. After the rework or redo of operations 41 (another loop) and 51 (another loop) from the manual override (operations 41 and 51 are in the history twice each now, from sub-activity 370 of FIG. 3), processing continues at operation 61.

The active lot plan is shown in FIG. 6 as active lot plan 606. Active lot plan 606 is called LotPlan_Expt1001, which includes operations 10, 20, 30 (the note for Special Processing Operations at operation 30) 41, 51, 41, 51, 61, and 71. Active lot plan 606 includes history 616 and remaining non-executed active lot plan 626 (e.g., a "future flow" part of the original plan that the lot still needs to follow, namely operations 61 and 71). Non-executed active lot plan 626 includes operations that have not yet been executed or performed, at or to which additional changes may be made. The current status of active lot plan 606 is at operation 61.

As can be seen from the example shown in FIG. 6 above, with ICFES 110, manual overrides may only be necessary when something unforeseen happens during execution. Without ICFES manual overrides may be necessary to perform special processing at operation 30, or otherwise to get the experimental flow to follow a non-standard flow.

Figure 7:
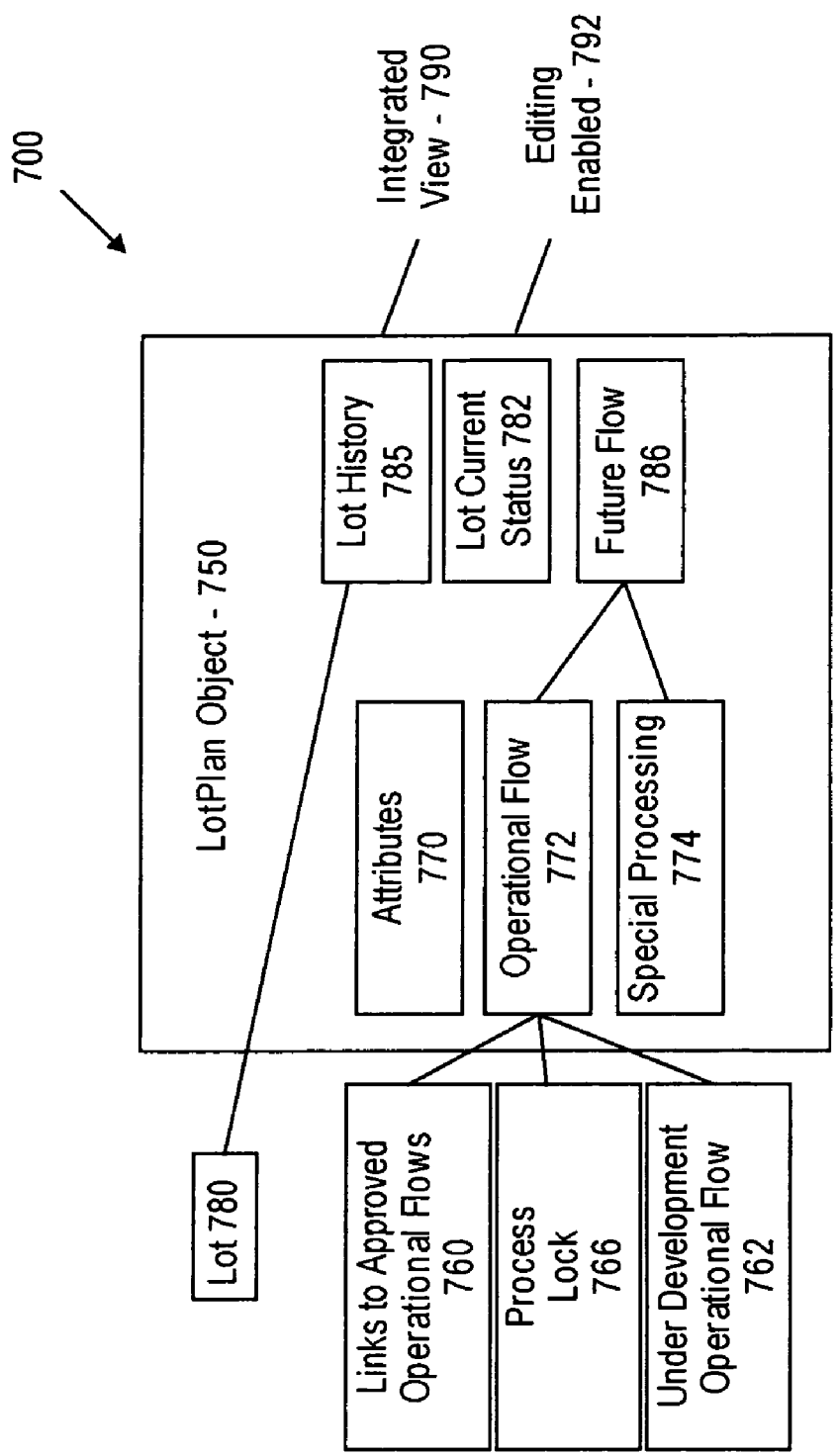
FIG. 7 is a block diagram of a lot plan object model.

FIG. 7 is a block diagram of a lot plan object model. FIG. 7 shows environment 700 including lot plan object 750 having attributes 770, operational flow 772 special processing 774, lot history 785, lot current status 782, and future flow 786. Environment 700 may include ICFES 110, editor 120, and data and functions thereof as described herein. For instance, operational flow 772 may correspond to plans 130 or blocks 140 of FIG. 1. Special processing 774 may correspond to special processing 165 of FIG. 1. Lot history 785 may correspond to histories 185 of FIG. 1. Lot current status 782 may correspond to a current operation of an active lot, such as operation 0005 of FIG. 13. Future flow 786 may correspond to processes or operations not yet executed for an active lot.

FIG. 7 also shows integrated view 790, such as a view including history 785, status 782 and flow 786. Integrated view 790 may be a view of an active lot, such as that shown in FIG. 13, 15, or 16. FIG. 7 shows lot 780 for which history 785, status 782, and flow 786 apply. For instance, lot 780 may be an experimental lot or a production lot that the active flow plan of object 750 is processing. Also, editing enabled 792 may include descriptions with respect to editor 120. Thus, editing and enabled 792 may allow a user to edit flow 786 (e.g., the unexecuted operations or processes of an active lot plan as described herein) such as to edit the unexecuted portion of the plan as described for FIG. 15.

FIG. 7 also shows links to approved operational flows 760 and under development operational flow 762. Flow 760 and flow 762 may correspond to descriptions herein for creating a block of flow blocks 140 (e.g., using or including flow plans, flow blocks, partial flow blocks, histories, and/or special processing, as described herein). Separating approved operational flows 760 from under development operational flow 762 (e.g., flows not approved) is process lock 766. Process lock 766 may be a lock as described for process locking component 138.

Thus, one technical advantage of environment 700 is that it integrates configuration and execution information into a single object (object 750), and provides an integrated environment for comprehensive experimental configuration without loss of efficiency. Also, environment 700 enables enhanced manufacturing analysis capability by presenting lot-specific integrated view 790 of historical and future flow and special processing information during non-standard processing. Finally, environment 700 allows enhanced, in-site editing (e.g., using through editing enabled 792) of active lot flows, in the context of the lot's specific processing history.

FIG. 8 is a block diagram of lot plan flow data structure (e.g., a lot plan) referencing multiple partial standard flows (e.g., referencing or created by combining multiple partial standard flow blocks, such as partial flow blocks 144 of standard processing 160). FIG. 8 shows lot plan flow 1-810 including segments or portions of Standard Flow A and portions of Standard Flow B. For example, flow 1-820 is show including Operation A1.0, Operation A2.0, and Operation A3.0 from Standard Flow A, as well as Operation B4.0, and Operation B5.0 from Standard Flow B. Thus, FIG. 8 describes the ability to reference partial segments of standard flows.

Figure 9:
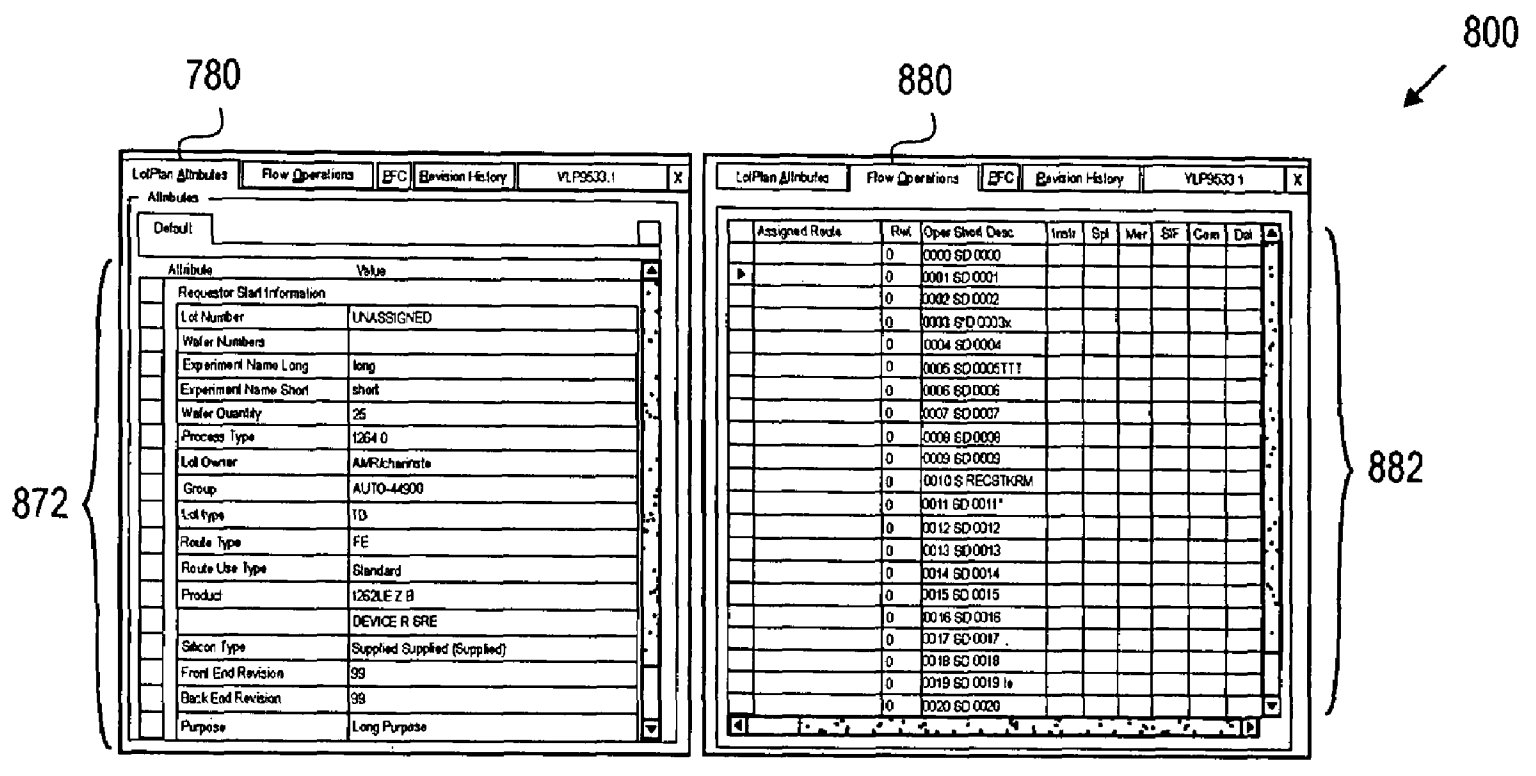

FIG. 9 is a screen view showing attribute and manufacturing operations of a pending lot plan having no special processing. FIG. 9 shows attributes 870 and flow operations 880 of pending lot plan 800. Attributes 870 include attributes of a pending lot plan in a table form, as table of attributes 872. Attributes 870 may describe basic properties of the lot to be manufactured, such as type of silicon to use, device to be manufactured, owning group, etc. This list of pre-manufacturing attributes is configurable, and can be easily modified or extended. Attributes 870 may correspond with attributes 770 of FIG. 7.

Similarly, flow operations 880 are shown in table form, as table of operations 882 having operations. Operational flow in table 882 is indicated by numerical operations (0000-0020) with short text descriptions. Flow operations 880 may correspond to operational flow 772 of FIG. 7.

For instance, prior to executing any manufacturing operations, pending lot plan 800 may be created by an engineer. Here, attributes 870, flow operations 880, and special processing instructions may be entered. Flow operations 880 (e.g., operations of a flow block) may include a series of standard operations that the lot should follow. In some cases, operations 880 may include only standard operations. The flow may be a new experimental flow, a common standard flow, or some combination of both new flow segments and standard flow segments. Each operation has a corresponding default recipe that is applied during manufacturing, so attributes and flow specification are sufficient to specify a manufacturing flow that includes a series of standard recipes, even if the particular sequence of operations is unique to that lot. However, often times it's necessary to provide lot-specific special processing instructions that aren't standard. These include applying a non-standard or new recipe at an operation, additional operations for the operator to perform between operations (e.g., between operations of flow operations 880), or instructions for the operation to split wafers out or merge wafers into the lot between operations (see FIG. 17). The lot plan concept and object (e.g., ICFES) supports specifying these various lot-specific special instructions, in addition to attribute and flow specification, in an integrated environment Specifically, FIG. 10 is a screen view of a pending lot plan having special processing. FIG. 10 shows pending lot plan 1000 (e.g., for a future lot) with operations 0001 through 0020, as indicated by single character flags in the columns following the operation column Oper.

The first column ("Instr") of lot plan 1000 following the operation short description indicates the existence of special s for the operator to perform between operations. In the absence of these instructions, when processing is complete at an operation, the operator moves the lot out of the completed operation, and into the next operation. Another operator identifies lots waiting for processing at the next operation, chooses one, has it delivered to their station, and proceeds to process it using the standard recipe.

Sometimes the lot engineer doesn't want the operation to be executed in the normal manner, and therefore specifies instructions (special processing) to follow between operations. Examples include placing the lot on hold, paging the lot owner, and delaying the lot's processing before the next operation. See FIG. 12 for the specification of a special processing set of tasks that should be followed before processing a lot at the operation.

The fourth column ("SIF") of lot plan 1000 indicates the existence of a non-standard recipe (special processing), to be used for processing at an operation. FIG. 13 shows the specification of a non-standard recipe at an operation. Thus, FIG. 10 shows pending lot plan 1000 with special processing instructions at operations 0002 and 0013, as indicated by single character flags in the columns following the SIF column.

According to some embodiments of the invention, using editor 120 and viewing the screen shown in FIG. 10, a user, engineer, or designer can add, edit, or view special processing instructions (such as right-clicking a mouse or using a keyboard of I/O 124 in the appropriate column) of lot plan 1000. Lot plan 1000 may correspond to a lot plan including flow operations 880 of FIG. 9.

Figure 11:
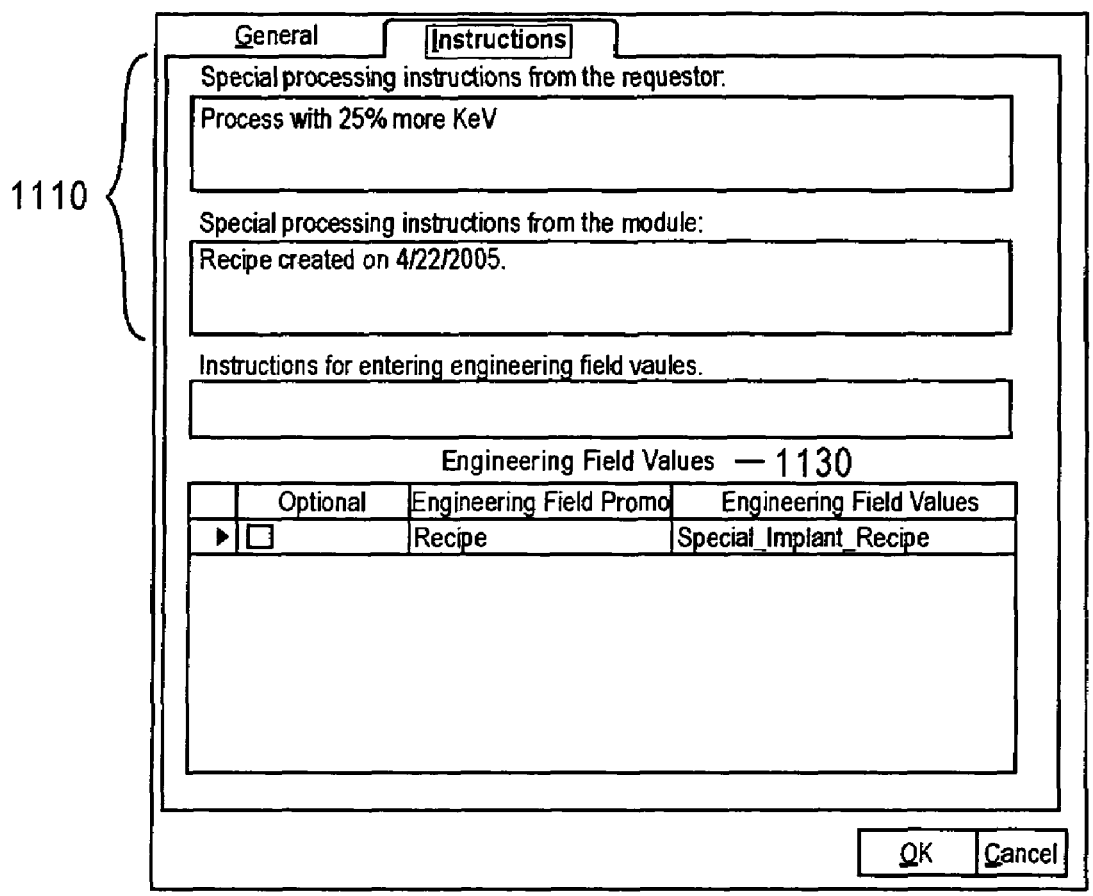
FIG. 11 is a screen view of special processing instructions for a non-standard recipe at an operation of a flow plan or flow block.

More particularly, FIG. 11 is a screen view of special processing instructions for a non-standard recipe at an operation of a flow plan or flow block. FIG. 11 shows special processing instructions 1110 for recipe having engineering field values 1130, such as to specify a non-standard recipe (special processing) for use in lot plan 1000.

Figure 12:
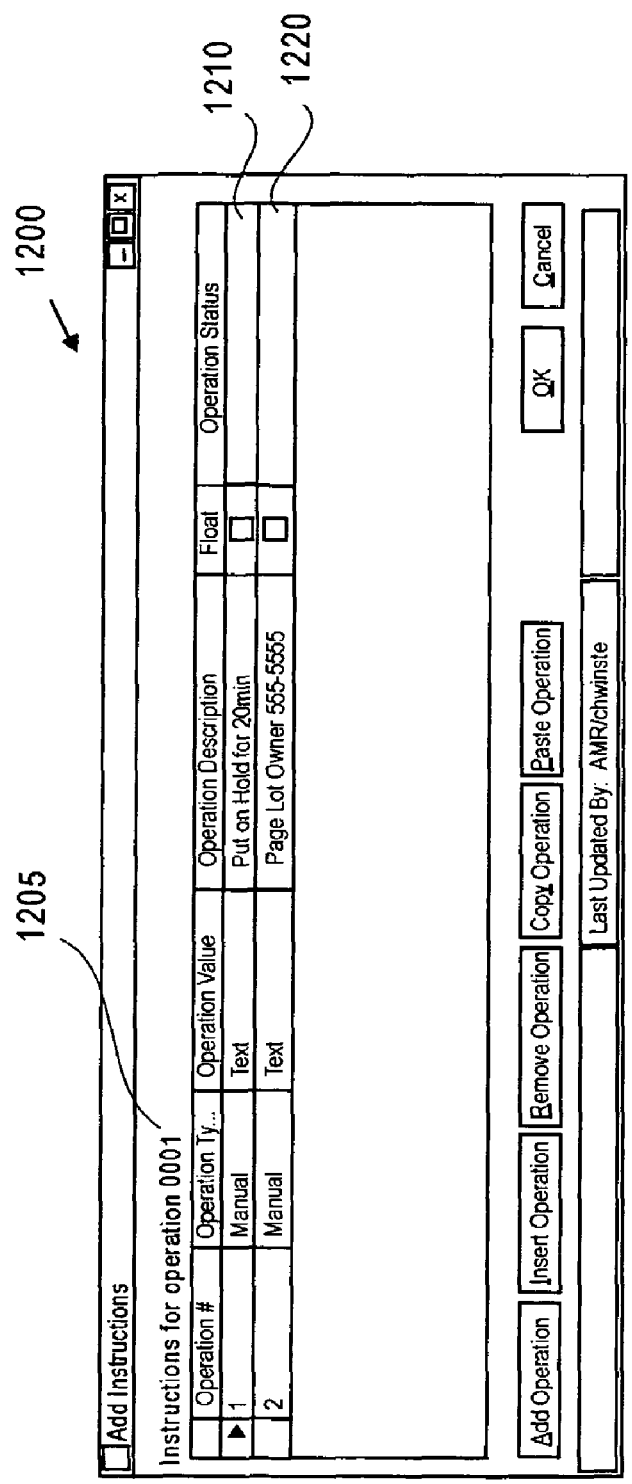
FIG. 12 is a screen view of a special process, manual special task to be performed between manufacturing operations.

Correspondingly, FIG. 12 is a screen view of a special process, manual special task to be performed between manufacturing operations. FIG. 12 shows manual override 1200 having manual operation 1210 and 1220 for operation 1205. Manual override 1200 may specify a non-standard recipe (special processing) for use in lot plan 1000 (e.g., operation 0001 of the lot plan of FIG. 10).

Using ICFES 110, when a lot is created and begins to be processed, the active lot plan may provide an integrated view of the actual processing history, current status and future flow of the lot. For instance, FIG. 13 is a screen view of an active lot plan showing non-executed operations and processing and executed operations and processing in a history. FIG. 13 shows active lot plans 1300 having history 1310 of executed processing or operations, lot current status 1320 at operation 0005, and future flow 1330 including operations or processing not yet executed. History 1310 may correspond to history 785 or histories 185. Status 1320 may correspond to status 782. Also, future flow 1330 may correspond to flow 786 or non-executed operations of an active lot plan.

The operations that have been completed are indicated with a special "check" icon. The lot's current location is indicated by the dark circle icon. The operations in the lot's future are indicated with the light circle icon. This view provides the lot owner with an integrated view of the history and the future of the lot to quickly diagnose issues and make appropriate changes in the plan for the future processing of the lot.

Figure 14:
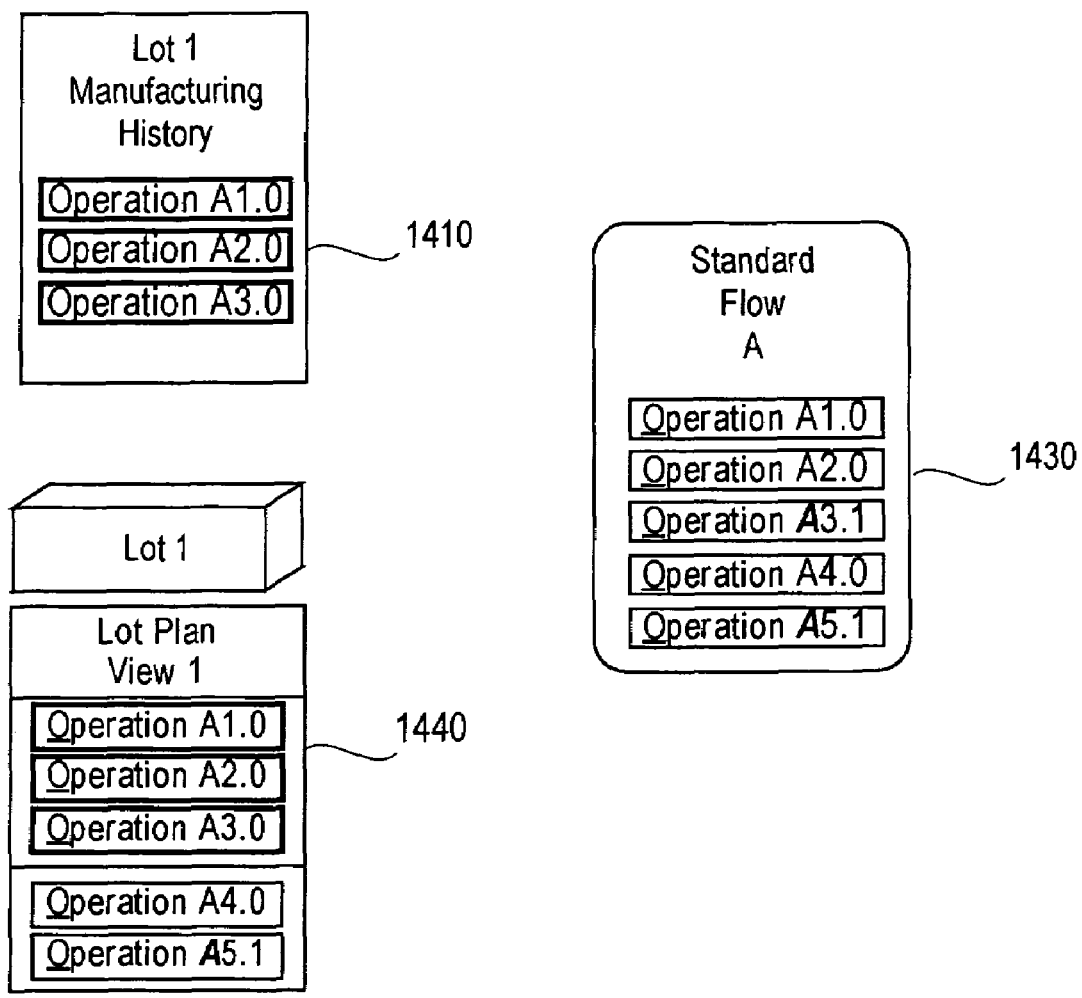
FIG. 14 is a block diagram of an active lot plan showing the pending portion of the active lot plan to be executed and a history included in the active lot plan.

FIG. 14 is a block diagram of an active lot plan showing the pending portion of the active lot plan to be executed and a history included in the active lot plan. FIG. 14 shows Lot Plan View 1-1440 including Lot 1 Manufacturing History 1410 and unexecuted operations of Standard Flow A 1430, for Lot 1-1405. Lot 1-1405 may correspond to an experimental or production lot. History 1410 may correspond to history 785, 185, or 1310. Flow A-1430 may correspond to a non-active flow plan such as operations 880, flow 820, plan 1000, or a plan of plans 150. Thus, View 1-1410 may be a view in accordance with integrated view 790.

In this example, the original flow specification for Lot 1 was to follow Standard Flow A. Many lots currently in process are also using Standard Flow A. At this time, Standard Flow A was comprised of operations A1.0 through A5.0. Lot 1 processed through operations A1.0, A2.0 and A3.0. At this point, Standard Flow A was changed by replacing Operations A3.0 and A5.0 with Operations A3.1 and A5.1, respectively. Since Lot 1 already received processing at Operation A3.0, its active lot plan flow doesn't reflect the change to A3.1, but since Lot 1 hasn't reached operation A5.0, its flow does reflect the change to A5.1. Note that the Flow of Lot 1 shown in the active lot plan is neither the original nor the new Standard Flow A—it is a lot-specific integration of the history of Lot 1 with the future defined by remaining portion of Standard Flow A. Other lots using Standard Flow A may have different flow views in their corresponding lot plans depending on the history of the lot's actual processing and the timing of changes to Standard Flow A.

Figure 15:
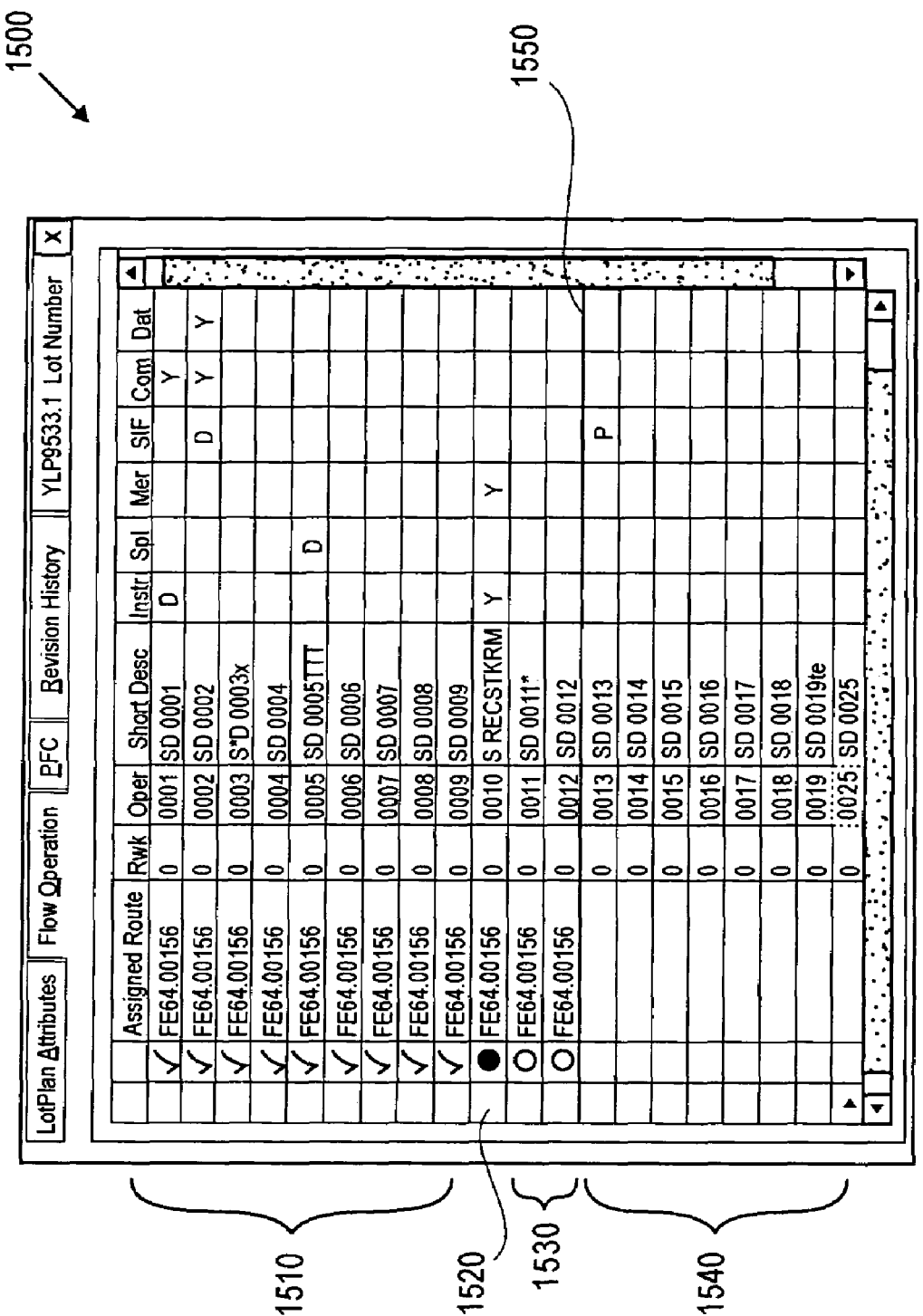
FIG. 15 is a screen view of an active lot plan showing an in-situ editing or updating of the active lot plan.

FIG. 15 is a screen view of an active lot plan showing an in-situ editing or updating of the active lot plan. FIG. 15 shows active lot plan 1500 including history 1510 of executed operations, current status 1520, unexecuted operations of active lot plan 1530, and in situ flow editing operations 1540. History 1510 may correspond to descriptions of history 1310, status 1520 may correspond to status 1320, and operations 1530 may correspond to operations 1330 of FIG. 13. Operations 1540 may be operations added to or used to update plans 1500, such as operations from another flow plan, flow block, partial flow block, history, special processing, standard processing, or manual override. Editing operations 1540 may correspond to descriptions with respect to arrows 574 of FIG. 5.

For instance, editor 120 also supports the ability to have an integrated flow specification for an active lot that's partially specified. If the flow for a lot needs to be modified after the lot has started processing, the lot engineer can specify a point in the flow, before which the lot's flow is valid, but beyond which the flow is "under construction". The active lot plan and editor 120 enables this flow specification in a single, integrated view so that the lot has one specification of flow, valid to a certain point and under development beyond that point, and the engineer making the flow changes can utilize all the previous lot processing information when deciding on the changes to the future flow. The active lot plan is integrated into the manufacturing execution system for the lot, so that the lot will not be allowed to process beyond the point at which the flow is not yet valid. Referring to FIG. 15, boundary 1550 between valid (e.g., Oper 0001-0012) and flow "under construction" (e.g., Oper 0013-0025) is called a process lock (e.g., see process locking component 138), and is shown by line 1550 in the flow.

Thus, the flow for the active lot plan can be edited by placing a process lock at a location or operation in the future flow section (e.g., future portion of the active lot plan). This process lock allows flow changes to be made in the flow following or after the process lock, and allows the lot to continue processing along the flow preceding the process lock. The lot cannot process beyond the process lock until the lock it removed, indicating that the flow edits are complete, and that the flow is now approved. This ability to make live, in situ modifications to a lot's flow, while allowing the lot to continue processing, and while maintaining a single, integrated definition increases efficiency and flexibility.

The lot plans and editor 120 shown in FIGS. 7-15 are an environment for configuring flow and special processing conditions. As shown in these figures, an actual processing history is also reflected, and the current state and location of the lot is indicated. The environment contains comments that the operators made during processing. If the lot goes through unplanned rework, or is manually adjust around operations from its original flow. These capabilities to give the engineer complete information to assist in making modifications to the processing flow.

Moreover, there is two-way integration as well, as the execution system enforces that the special processing conditions are completed before allowing the lot to move, it automatically executes the flow in the active lot plan across flow block boundaries, and if the lot reaches the process lock location, the lot is automatically sent to a holding state until flow development is complete.

As the lot continues processing, the active lot plan flow is comprised of more history operations than future operations. When the lot completes processing, the active lot plan flow is entirely made up of historical information. At this point, no changes to the underlying flow components are reflected in the active lot plan flow, since the lot is not affected by them. For example, FIG. 16 is a screen view of an active lot plan having all operations completed (e.g., a history). FIG. 16 shows completed active lot plan 1600 having all operations of that lot plan completed. Plan 1600 includes history 1610, such as a history described with respect to history 1510 of FIG. 15. Thus, plan 1600 or history 1610 may correspond to a history of histories 185 or 585 of FIG. 5, while history 1510 or 1310 corresponds to history 554 of FIG. 5.

Figure 17:
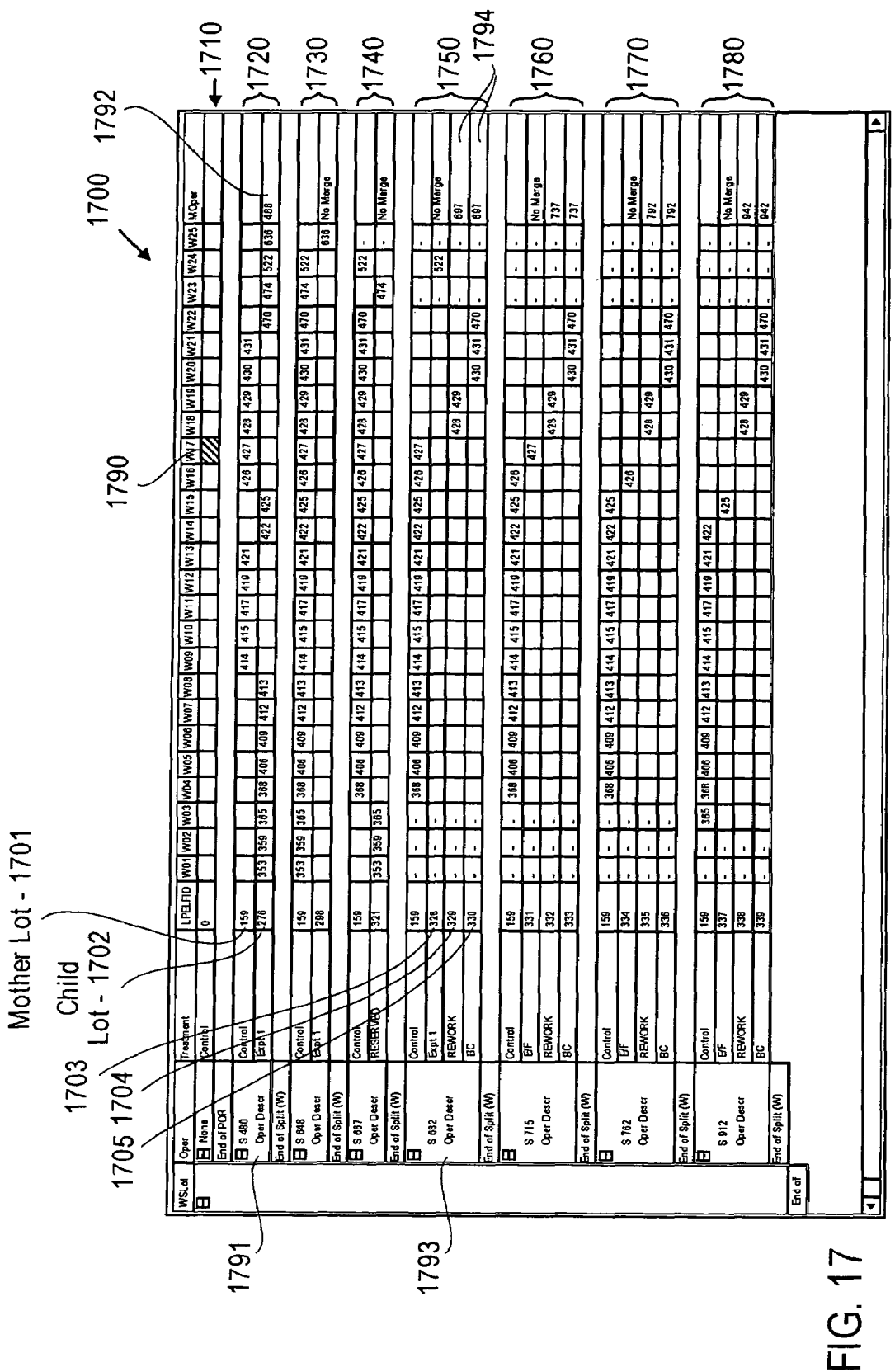
FIG. 17 is a screen view of a multi-lot view showing experimental splits and allocations of portions of the manufacturing object, lot, or wafers.

Returning to FIG. 10, the second ("Spl") and third ("Mer") columns of lot plan 1000 following the operation short description indicate the existence of splits and merges to be performed at an operation. FIG. 10 is a very operator centric view of how and when to execute splits and merges, but it doesn't provide a high-level view to the engineer of the overall experiment to be conducted. However, ICFES 110 provides a "split-chart" view of the overall experiment, the experimental splits and wafer assignments needed. This allows balancing of experiment setup without getting lost in the details of complete process specification. The split chart view is shown in FIG. 17. FIG. 17 is a screen view of a multi-lot view showing experimental splits and allocations of portions of the manufacturing object, lot, or wafers. FIG. 17 shows multi-lot view 1700 including a lot split into experimental splits and wafer allocations 1720, 1730, 1740, 1750, 1760, 1770, 1780. Causing view 1700 to be displayed may include using, ICFES 110, and editor 120, and/or split chart component 174. Control 1710 shows by black box 1790, the current status of the active process at portion 1720-1780 are being processed according to.

For instance, ICFES 110, editor 120, and/or splitting/merging component 170 may be used to cause an active lot plan to be split and/or merged during executing. For instance, an active lot plan can be split into a first active lot plan for a first portion of a lot of wafers and a second active lot plan for a second portion of the lot of wafers. The first active lot plan and the second active lot plan may then be display together on a single display (e.g., display 128). Subsequent to splitting, the first active lot plan and the second active lot plan, or portions thereof may be merged together into a single combined active lot plan. The merged combined active lot plan can be displayed on a single display to clearly show the flow blocks, special processing, standard processing, histories, manual overrides and or operations that are similar or the same for the split portions as compared to those that are different or not the same.

As shown in FIG. 17, wafers can be split out of a lot to form a child lot that can undergo a separate segment of operations and then may merge back into the original lot. In the example shown in FIG. 17, the lot plan for the original lot (a.k.a mother lot 1701, with lot plan ID 159), specifies that at Operation 480-1791 (see second column entitled "Oper"), 14 wafers (with wafer IDs 353, 359, 365, 368, 405, 409, 412, 413, 422, 425, 470, 474, 522, and 636) are removed from the mother lot and placed into another container, creating a "child lot". Child lot plan 1702, with lot plan ID 276, is created and contains the flow and special processing instructions for these 14 wafers. This child lot plan is merged back with its mother lot plan at operation 488-1792. Similarly, at operation 682-1793, 3 child lot plans are created, with IDs 328-1703, 329-1704 and 330-1705. Child lot plan 328-1703 received wafer 522, child lot plan 329-1704 receives wafers 428 and 429, and child lot plan 330-1705 receives wafers 430, 431 and 470. Child lot plans 329-1704 and 330-1705 merge back into mother lot plan 159 at operation 697-1794, but child lot plan 328-1703 never merges.

Hence, editor 120 provides a high-level display of multi-lot experiments and wafer assignments to provide a summarized view of all lots within an experiment and the wafers assigned to each child lot. Moreover, editor 120 allows the wafer assignments to be edited and changed to create (e.g., split away from the mother lot) the child lot portions, and merge the (e.g., recombine together with the mother lot) the child lot portions in a single view or on a single display. Thus, a family of wafers of an active lot plan can be split (e.g., using editor 120 and/or a single UI) during executing into various active lot plans for portions of the family of wafers. The various active lot plans and portions can be display together on a single display (e.g., using editor 120 and/or a single UI). The various active lot plans and portions can also be merged together back into a single family having a single active lot plan future portion (e.g., using editor 120 and/or a single UI). It can be appreciated that this consolidated view of split and merge actions across all lot plans within a family (e.g., reassignment of wafers across splits) provides an efficient mechanism for validating the overall experiment being performed and for re-balancing wafer assignments across many lot plans within a family.

Thus, the descriptions herein provide a tightly integrated configuration and execution system (e.g., ICFES 110 and editor 120) that enables the configuration system to reflect up-to-date execution conditions, such as rework flows, manual overrides of prescribed flows, and adjusted special processing details, using: 1) A lot "plan" metaphor (e.g., see lot plans 150 and object 750) that allows viewing and editing processing information that is consistent throughout the manufacturing lifecycle—from planning prior to physical processing, throughout physical execution and after physical processing is complete; 2) A lot-specific integrated view (e.g., see display 128, editor 120, integrated view 790, FIGS. 10, 13, and 15) of historical and future flow information within an environment that supports editing of future flow conditions for highly customized flows; and 3) A combination of a lot-specific structure (e.g., see FIGS. 1, 5, 7, and 8) to store historical flow information and a shared structure to represent future flow specification that enables efficient management of high-volume production material.

Similarly, the descriptions herein provide an integrated interface (ICFES 110 and editor 120) for specification of experimental flow and special processing instructions for highly customized experiment flows, including: 1) An integrated editing environment (e.g., see display 128, editor 120, FIGS. 1, 2A-B, 4, 7, 9-13, and 15-16) for specifying new operational flows and custom special processing instructions; and 2) A high-level view of a multi-lot experiments and wafer assignments (e.g., see FIGS. 1, 5, 7 and 17), linked to lot-specific detailed flow and special processing specification; and 3) Support for flow construction by composition of references to complete or partial segments of standard flow components, rather than duplicating standard flow specifications (e.g., see FIGS. 1, 3-8, and 15).

In the foregoing specification, specific embodiments of the invention are described. However, various modifications and changes may be made thereto without departing from the broader spirit and scope of embodiments of the invention as set forth in the claims. The specification and drawings are, accordingly, to be regarded in an illustrative rather than a restrictive sense.

What is claimed is:

1. A method comprising:
   referencing a first pre-existing flow block and a second pre-existing flow block;
   combining a reference to a partial flow of the first pre-existing flow block and a reference to a partial flow of the second pre-existing flow block into a semiconductor device processing future flow plan, while maintaining the reference to the first pre-existing flow block and to the second pre-existing flow block;
   creating a pending lot plan to process a lot of wafers, the pending lot plan based on blocks of the future flow plan combined;
   executing a portion of the pending lot plan to process a lot of wafers; and
   creating an active lot plan comprising an unexecuted portion of the pending lot plan.

2. The method of claim 1, further comprising:
   combining a special process into the pending lot plan.

3. The method of claim 2, further comprising:
   creating a lot history based on the executed portion; and
   creating an active lot plan comprising combining the unexecuted portion of the pending lot plan and the lot history.

4. The method of claim 3, further comprising:
   executing a manual override during executing of the portion of the pending lot plan,
   wherein the lot history includes the executed manual override.

5. The method of claim 3, further comprising:
   splitting the active lot plan during executing into a first active lot plan for a first portion of the lot of wafers and a second active lot plan for a second portion of the lot of wafers; and
   combining a special process into the second active lot plan to cause the second active lot plan to be different than the first active lot plan.

6. The method of claim 5, further comprising merging together into a single combined active lot plan, the first active lot plan and the different second active lot plan.

7. The method of claim 5, further comprising displaying together on a single display the first active lot plan and the different second active lot plan.

8. The method of claim 1, wherein the first pre-existing flow block and the second pre-existing flow block are experimental flow blocks, the future flow plan is a production flow plan; and wherein referencing and combining are performed by a single software application.

9. The method of claim 8, further comprising changing the referenced partial flow of the first pre-existing flow block, wherein changing comprises changing the future flow plan.

10. The method of claim 1, wherein maintaining the reference comprises a live link to the first pre-existing flow block and to the second pre-existing flow block.

11. An apparatus comprising:
    a processor coupled to a memory, the memory storing:
       a first reference to a first pre-existing flow plan for processing semiconductor devices;
       a second reference to a second pre-existing flow plan for processing semiconductor devices;
       a combined flow block, the combined flow block including references to flow blocks of a partial flow of the first pre-existing flow plan, references to flow blocks of a partial flow of the second pre-existing flow plan, and a special process;
       a pending lot plan that when executed by the processor causes a machine to process a lot of wafers, the pending lot plan comprising manufacturing operations of the combined flow block and a special process; and
       an active lot plan comprising an unexecuted portion of the pending lot plan.

12. The apparatus of claim 11, the memory further storing:
    an active lot plan comprising the unexecuted portion of the pending lot plan and a lot history, the lot history based on an executed portion of the pending lot plan.

13. The apparatus of claim 12, further comprising:
    an editor locking component coupled to the processor to prohibit multiple users from simultaneously editing one of the combined flow block, the pending lot plan, and the active lot plan.

14. The apparatus of claim 12, the memory further storing:
    a first split active lot plan for a first portion of the lot of wafers and a different second split active lot plan for a second portion of the lot of wafers.

15. The apparatus of claim 14, the memory further storing:
    a merged active lot plan including the first split active lot plan for the first portion of the lot of wafers and the different second split active lot plan for a second portion of the lot of wafers.

16. The apparatus of claim 15, further comprising:
    an editor to create the combined flow block, add a special process to one of the combined flow block and the pending lot plan, view the active lot plan, create the first split active lot plan and the second split active lot plan, and create the merged active lot plan.

17. The apparatus of claim 12, further comprising:
    a process locking component coupled to the processor to stop execution of the unexecuted portion of the pending lot plan at a selected manufacturing operation of the combined flow block, and to allow in-situ editing of the unexecuted portion of the pending lot plan after the selected manufacturing operation.

18. A computer readable medium containing instructions that, when executed, cause a machine to:
    combine a reference to a partial flow of a first pre-existing flow block and a reference to a partial flow of a second pre-existing flow block into a semiconductor device processing future flow plan;
    create a pending lot plan to process a lot of wafers, the pending lot plan comprising referenced processes of the future flow plan combined with a special process;
    execute a portion of the pending lot plan to process a lot of wafers;
    create an active lot plan comprising an unexecuted portion of the pending lot plan; and combine a special process into the unexecuted portion of the pending lot plan during executing of the executed portion of the pending lot plan.

19. The computer readable medium of claim 18, further comprising instructions that, when executed, cause the machine to:
create a lot history based on the executed portion;
create an active lot plan comprising combining an unexecuted portion of the pending lot plan and the lot history.

20. A computer readable medium containing instructions that, when executed, cause a machine to:
combine a reference to a partial flow of a first pre-existing flow block and a reference to a partial flow of a second pre-existing flow block into a semiconductor device processing future flow plan;
create a pending lot plan to processes a lot of wafers, the pending lot plan comprising referenced processes of the future flow plan combined with a special process, wherein the future flow plan is an experimental flow plan;
further comprising instructions that, when executed, cause the machine to:
execute an experimental lot plan based on the experimental flow plan to process an experimental lot of wafers;
update the experimental lot plan based on results of executing the experimental lot plan
create a production flow plan based on the updated experimental lot plan, using the machine; and
execute a production lot plan based on the production flow plan to process a production lot of wafers, using the machine.

21. A method comprising:
combining a reference to a partial flow of at least one pre-existing flow block and a special process into a pending lot plan to specify, control, and record a history of processing of semiconductor devices;
executing a portion of the pending lot plan to process a lot of wafers;
creating the lot history based on the executed portion; and
creating an active lot plan comprising combining an unexecuted portion of the pending lot plan, the lot history, and the special process.

22. The method of claim 21, wherein the lot plan includes a flow plan including the at least one pre-existing flow block;
further comprising configuring each pre-existing flow block to reference a segment of standard flow block, while retaining a reference to the standard flow block.

23. The method of claim 21, further comprising:
starting processing of the semiconductor devices;
displaying an active lot plan including:
a future portion of the lot plan; and
a history of the executed operations of the lot plan;
using a single editor and user interface to combine, start and display.

24. A method comprising:
referencing a first pre-existing flow block and a second pre-existing flow block; and
combining a reference to a partial flow of the first pre-existing flow block and a reference to a partial flow of the second pre-existing flow block into a semiconductor device processing future flow plan, while maintaining the reference to the first pre-existing flow block and to the second pre-existing flow block, wherein combining comprises maintaining a live link to a definition of the first pre-existing flow block and of the second pre-existing flow block without copying data of the first pre-existing flow block or the second pre-existing flow block into the future flow plan.

* * * * *